US012230428B2

(12) United States Patent
Yoshioka et al.

(10) Patent No.: US 12,230,428 B2
(45) Date of Patent: Feb. 18, 2025

(54) INDUCTOR COMPONENT

(71) Applicant: Murata Manufacturing Co., Ltd., Kyoto-fu (JP)

(72) Inventors: Yoshimasa Yoshioka, Nagaokakyo (JP); Ryuichiro Tominaga, Nagaokakyo (JP); Akinori Hamada, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 0 days.

(21) Appl. No.: 17/747,696

(22) Filed: May 18, 2022

(65) Prior Publication Data

US 2022/0277878 A1 Sep. 1, 2022

Related U.S. Application Data

(62) Division of application No. 16/040,029, filed on Jul. 19, 2018, now Pat. No. 11,367,552.

(30) Foreign Application Priority Data

Sep. 4, 2017 (JP) ................................ 2017-169437

(51) Int. Cl.
*H01F 5/00* (2006.01)
*H01F 17/00* (2006.01)
(Continued)

(52) U.S. Cl.
CPC ..... *H01F 17/0006* (2013.01); *H01F 27/2804* (2013.01); *H01F 27/2823* (2013.01);
(Continued)

(58) Field of Classification Search
CPC .................................................. H01F 27/2804
(Continued)

(56) References Cited

U.S. PATENT DOCUMENTS 6,304,164 B1 10/2001 Ohno et al.
6,392,525 B1 * 5/2002 Kato .................... H01F 27/022 336/200
(Continued)

FOREIGN PATENT DOCUMENTS

CN 107039144 A 8/2017
CN 107068351 A 8/2017
(Continued)

OTHER PUBLICATIONS

English translation of JP 2004014837 (Year: 2004).*
(Continued)

*Primary Examiner* — Ronald Hinson
(74) *Attorney, Agent, or Firm* — Studebaker & Brackett PC

(57) ABSTRACT

An inductor component comprising a spiral wiring wound on a plane; first and second magnetic layers located at positions sandwiching the spiral wiring from both sides in a normal direction relative to the plane of the wound spiral wiring; a vertical wiring extending from the spiral wiring in the normal direction to penetrate at least the inside of the first magnetic layer; and an external terminal disposed on at least a surface of the first magnetic layer to cover an end surface of the vertical wiring. The first magnetic layer is larger than the second magnetic layer in terms of the area of the external terminal viewed in the normal direction, and when A is the thickness of the first magnetic layer and B is the thickness of the second magnetic layer, A/((A+B)/2) is from 0.6 to 1.6.

20 Claims, 14 Drawing Sheets

(51) Int. Cl.

| | |
|---|---|
| ***H01F 27/28*** | (2006.01) |
| ***H01F 27/29*** | (2006.01) |
| ***H01F 27/32*** | (2006.01) |
| ***H01F 41/063*** | (2016.01) |
| *H01F 3/10* | (2006.01) |
| *H01F 17/04* | (2006.01) |

(52) U.S. Cl.

CPC .......... *H01F 27/29* (2013.01); *H01F 27/292* (2013.01); *H01F 27/32* (2013.01); *H01F 27/323* (2013.01); *H01F 27/324* (2013.01); *H01F 41/063* (2016.01); *H01F 2003/106* (2013.01); *H01F 2017/0066* (2013.01); *H01F 17/04* (2013.01); *H01F 2017/048* (2013.01)

(58) Field of Classification Search

USPC .......................................................... 336/200

See application file for complete search history.

(56) References Cited

U.S. PATENT DOCUMENTS

| | | | | |
|---|---|---|---|---|
| 2012/0105188 | A1* | 5/2012 | Lim | H01F 27/29 336/200 |
| 2012/0119863 | A1 | 5/2012 | Wu | |
| 2014/0176284 | A1 | 6/2014 | Lee et al. | |
| 2015/0002252 | A1* | 1/2015 | Masaki | H01F 27/327 336/221 |
| 2015/0371752 | A1* | 12/2015 | Park | H01F 27/255 336/200 |
| 2017/0084376 | A1 | 3/2017 | Kubota et al. | |
| 2017/0098997 | A1 | 4/2017 | Hamada et al. | |
| 2017/0162317 | A1* | 6/2017 | Taniguchi | H01F 27/255 |
| 2017/0169930 | A1 | 6/2017 | Kudo et al. | |
| 2018/0322999 | A1 | 11/2018 | Kubota et al. | |

FOREIGN PATENT DOCUMENTS

| | | | |
|---|---|---|---|
| JP | 2004-014837 | A | 1/2004 |
| JP | 2006-210541 | A | 8/2006 |
| JP | 2008-085057 | A | 4/2008 |
| JP | 2014-127717 | A | 7/2014 |
| JP | 6024243 | B2 | 11/2016 |
| JP | 2017-069523 | A | 4/2017 |
| JP | 2017-103355 | A | 6/2017 |
| JP | 2017-107971 | A | 6/2017 |
| WO | 2016/013643 | A1 | 1/2016 |

OTHER PUBLICATIONS

English translation of WO2016199637 (Year: 2016).*

An Office Action; "Notification of Reasons for Refusal," Mailed by the Japanese Patent Office on Nov. 26, 2019, which corresponds to Japanese Patent Application No. 2017-169437 and is related to U.S. Appl. No. 16/040,029; with English language translation.

An Office Action mailed by the Japanese Patent Office on Jun. 2, 2020, which corresponds to Japanese Patent No. 2017-169437 and is related to U.S. Appl. No. 16/040,029 with English language translation.

An Office Action; "Notice of Reasons for Refusal," mailed by the Japanese Patent Office on Jun. 22, 2021, which corresponds to Japanese Patent Application No. 2020-140164 and is related to U.S. Appl. No. 16/040,029 with English language translation.

* cited by examiner

INDUCTOR COMPONENT

CROSS REFERENCE TO RELATED APPLICATION

This application is a Divisional of U.S. patent application Ser. No. 16/040,029 filed on Jul. 19, 2018, which claims benefit of priority to Japanese Patent Application 2017-169437 filed Sep. 4, 2017, the entire content of which is incorporated herein by reference.

BACKGROUND

Technical Field

The present disclosure relates to an inductor component.

Background Art

Electronic devices such as notebooks, smart phones, and digital TVs are recently increasingly reduced in size and thickness. Accordingly, small-sized thin components of a surface mount type capable of reducing a mounting area are required for inductor components mounted on electronic devices.

For example, an IVR technique is a technique of integrating a system of a voltage regulator in an IC package to achieve power saving and miniaturization. Implementation of this technique requires a small-sized thin power inductor that can be incorporated in the IC package.

Additionally, a smart card must have the card thickness of 0.76 mm while including a voltage regulator, a battery charger, etc. in the card (defined by ISO/IEC 7810). Therefore, a thin inductor capable of being mounted on a thin card is required.

A conventional surface-mount thin inductor component is described in Japanese Patent No. 6024243. The inductor component includes a spiral wiring wound on a plane of a printed circuit board and a first magnetic layer and a second magnetic layer located at positions sandwiching the spiral wiring. Specifically, spiral wirings are formed on upper and lower surfaces of the printed circuit board, and a magnetic material is filled therearound to reduce a magnetic resistance so that an inductor component with high acquisition efficiency of inductance is implemented.

SUMMARY

As further thinning is promoted, the influence of variation at the time of manufacturing becomes more significant. Specifically, a thickness is reduced in each portion of the inductor component due to thinning; however, an amount of variation in thickness of each portion is not always reduced even if the thinning is performed. For example, in the conventional technique, the thickness of the first magnetic layer and the second magnetic layer is adjusted by grinding of the surface; however, the grinding accuracy depends on equipment and a manufacturing process rather than the thickness of the inductor component. Therefore, in this case, the thinning makes variations in thickness of the first magnetic layer and the second magnetic layer relatively larger.

As described above, the thicknesses of the first magnetic layer and the second magnetic layer affect the acquisition efficiency of inductance, and therefore, as variation in these thicknesses increases, variation in inductance value of the inductor component becomes larger.

Therefore, the present disclosure provides an inductor component capable of reducing variation in inductance value even if thinning is further performed.

An aspect of the present disclosure provides an inductor component comprising a spiral wiring wound on a plane; a first magnetic layer and a second magnetic layer located at positions sandwiching the spiral wiring from both sides in a normal direction relative to the plane of the wound spiral wiring; a vertical wiring extending from the spiral wiring in the normal direction to penetrate at least the inside of the first magnetic layer out of the first magnetic layer and the second magnetic layer; and an external terminal disposed on at least a surface of the first magnetic layer out of the first magnetic layer and the second magnetic layer to cover an end surface of the vertical wiring. The first magnetic layer is larger than the second magnetic layer in terms of the area of the external terminal viewed in the normal direction. Also, when A is the thickness of the first magnetic layer and B is the thickness of the second magnetic layer, $A/((A+B)/2)$ is 0.6 or more and 1.6 or less (i.e., from 0.6 to 1.6).

According to the inductor component of the present disclosure, since the relative relationship between the thickness of the first magnetic layer and the thickness of the second magnetic layer has a relatively large margin, even the adjustment can be made by grinding, for example. Additionally, as described later, an influence on the inductance value is small.

Therefore, even when thinning is further performed, variations in the inductance value can be reduced. In the present application, a "spiral wiring" is a curve (two-dimensional curve) formed into a planar shape with the number of turns less than one and may have a portion that is a linear part.

In an embodiment of the inductor component, the thickness of the first magnetic layer is greater than the thickness of the second magnetic layer. According to the embodiment, since the thickness of the first magnetic layer is greater than the thickness of the second magnetic layer, narrower deviation of inductance can be achieved.

In an embodiment of the inductor component, the thickness of the first magnetic layer and the thickness of the second magnetic layer are each 10 μm or more. According to the embodiment, since the thickness of the first magnetic layer and the thickness of the second magnetic layer are each 10 μm or more, the spiral wiring can be restrained from being exposed from the first and second magnetic layers.

In an embodiment of the inductor component, the spiral wiring is a conductor made of copper or a copper compound. According to the embodiment, the DC resistance of the spiral wiring can be lowered.

In an embodiment of the inductor component, the spiral wiring is covered with an insulating resin made of an inorganic filler and an organic resin. According to the embodiment, insulation can reliably be ensured even if a gap is narrowed between wirings of the spiral wiring, so that a highly-reliable inductor component can be provided.

In an embodiment of the inductor component, the thickness of the inductor component is 0.35 mm or less. According to the embodiment, the component can sufficiently be mounted even in applications requiring thinness such as smart cards.

In an embodiment of the inductor component, the thickness of the spiral wiring is greater than $(A+B)/2$ and less than $2(A+B)$. According to the embodiment, even if the component is made thinner, the inductance can be ensured while reducing the DC resistance of the spiral wiring.

In an embodiment of the inductor component, the thickness of the inductor component is 0.2 mm or less. According to the embodiment, even the thin inductor component can ensure the inductance while reducing the DC resistance of the spiral wiring.

In an embodiment of the inductor component, the magnetic permeability of the second magnetic layer is higher than the magnetic permeability of the first magnetic layer. According to the embodiment, the acquisition efficiency of inductance can be made higher.

In an embodiment of the inductor component, the vertical wiring is not present inside the second magnetic layer. According to the embodiment, the acquisition efficiency of inductance is increased by not forming a vertical wiring, which reduces the volume of the magnetic material, in the second magnetic layer having the magnetic permeability higher than the first magnetic layer. Since the second magnetic layer is more significantly affected by processing than the first magnetic layer, the yield can be increased by not forming a vertical wiring in the second magnetic layer.

In an embodiment of the inductor component, the first magnetic layer is a composite material of an inorganic filler made of an FeSi- or FeCo- or FeAl-based alloy or an amorphous alloy thereof and an epoxy- or polyimide- or phenol-based organic resin. The content percentage of the inorganic filler is 50 vol % or more based on the organic resin, and the inorganic filler is substantially spherical. According to the embodiment, since the first magnetic layer is a composite material of an inorganic filler and an organic resin and the content percentage of the inorganic filler is 50 vol % or more, even if the vertical wiring is disposed in the first magnetic layer, both magnetic characteristic and workability can be satisfied. Since the inorganic filler is substantially spherical, when the vertical wiring is disposed in the first magnetic layer, the vertical wiring is easily filled in a slipping manner in the first magnetic layer.

In an embodiment of the inductor component, at least a portion between the first magnetic layer and the second magnetic layer includes a region in which an amount of magnetic powder is smaller as compared to the first magnetic layer and the second magnetic layer. According to the embodiment, since a region containing a smaller amount of the magnetic powder exists between the first magnetic layer and the second magnetic layer, the adhesion is improved between the first magnetic layer and the second magnetic layer, and the inductor component can be improved in the strength of the magnetic layer. Additionally, by disposing the region containing a smaller existing amount of the magnetic powder, the magnetic saturation characteristics may be improved.

In an embodiment of the inductor component, the thickness of the region is 0.5 μm or more and 30 μm or less (i.e., from 0.5 μm to 30 μm). According to the embodiment, the inductor component can be reduced in thickness and improved in the strength of the magnetic layer, or the magnetic saturation characteristics may be improved.

In an embodiment of the inductor component, the spiral wiring is one of multiple spiral wirings, and a via conductor connecting the spiral wirings in series is further included between the multiple spiral wirings. Also, the same layer as the via conductor including the via conductor includes only the conductor, the inorganic filler, and the organic resin. According to the embodiment, the same layer as the via conductor does not include a base material such as glass cloth requiring a certain thickness and is thus relatively reduced in amount of a portion that does not contribute to the electric characteristics while enabling the thinning, so that the electric characteristics can be improved even though the thickness is the same.

In an embodiment of the inductor component, the thickness of the same layer as the via conductor is 1 μm or more and 20 μm or less (i.e., from 1 μm to 20 μm). According to the embodiment, since the thickness of the same layer as the via conductor is 1 μm or more, a short circuit between the spiral wirings can reliably be prevented, and since the thickness of the same layer as the via conductor is 20 μm or less, the thin inductor component can be provided.

In an embodiment of the inductor component, the inorganic filler is made of at least one of an FeSi alloy, an FeCo alloy, an FeAl alloy, an amorphous alloy thereof, and $SiO_2$, and the average particle size of the inorganic filler is 5 μm or less. According to the embodiment, a loss can be reduced at high frequency and the insulation can be ensured.

According to the inductor component of an aspect of the present disclosure, variation in inductance value can be reduced even if thinning is further performed.

DETAILED DESCRIPTION

An aspect of the present disclosure will now be described in detail with reference to shown embodiments.

First Embodiment (Configuration)

Figure 1:
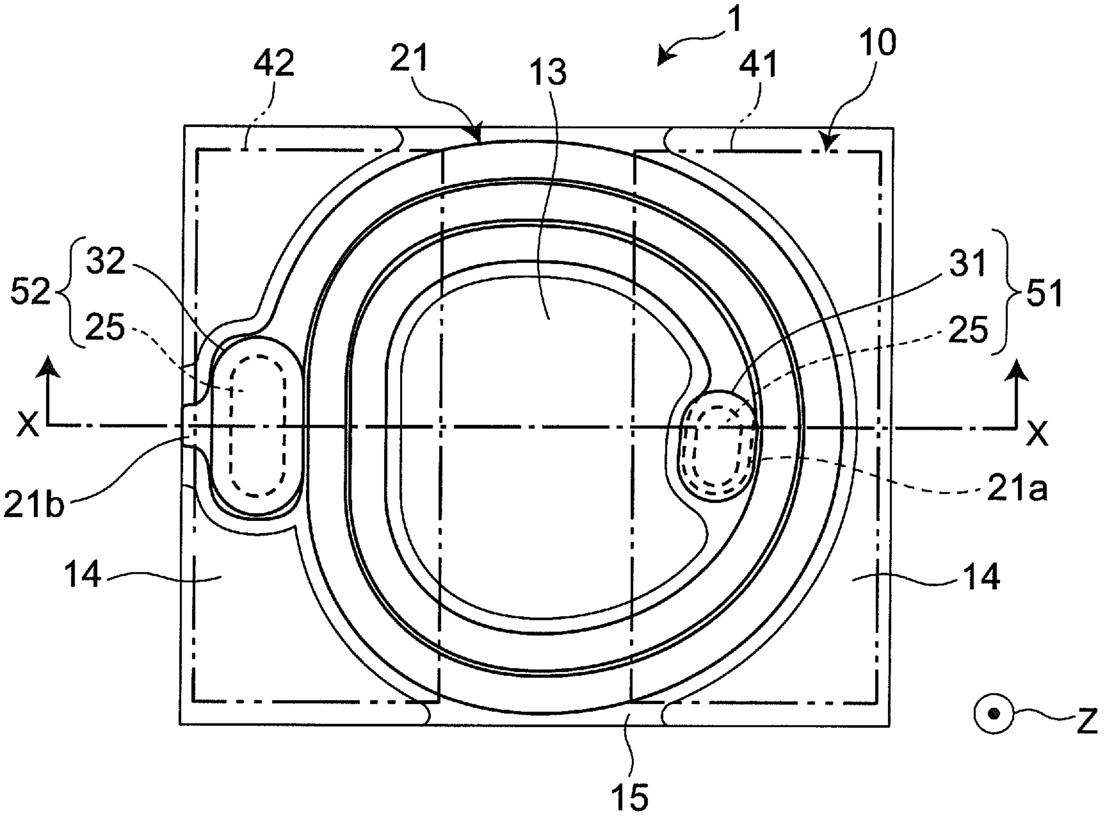
FIG. 1 is a perspective plane view of an inductor component according to a first embodiment.
Figure 2:
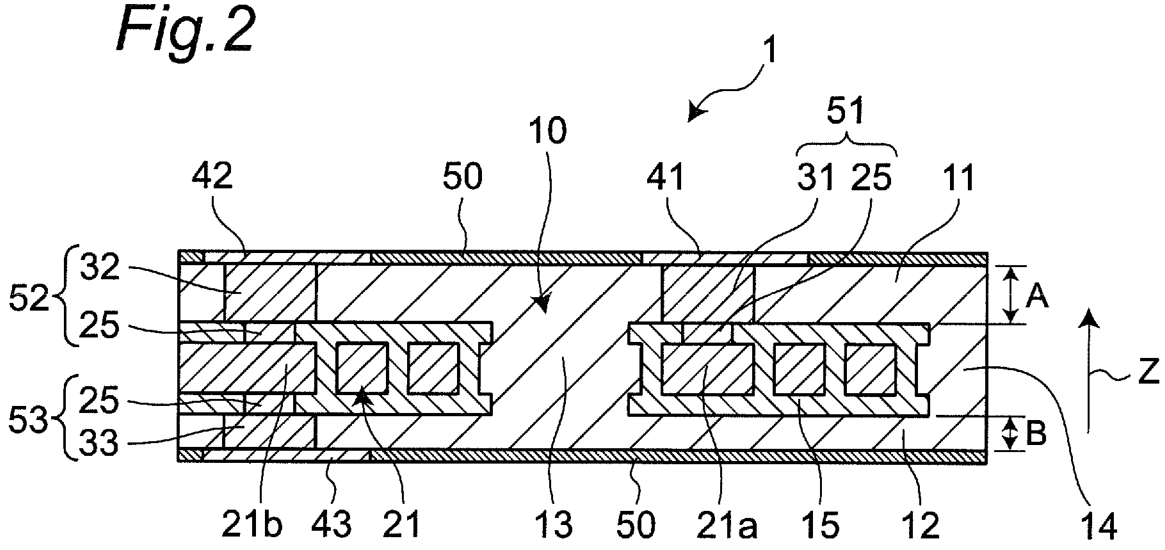
FIG. 2 is a cross-sectional view of the inductor component according to the first embodiment.

FIG. 1 is a perspective plane view of a first embodiment of an inductor component. FIG. 2 is a cross-sectional view taken along a line X-X in FIG. 1.

An inductor component 1 is mounted on an electronic device such as a personal computer, a DVD player, a digital camera, a TV, a portable telephone, and automotive electronics, for example, and is a component generally having a rectangular parallelepiped shape, for example. However, the shape of the inductor component 1 is not particularly limited and may be a circular columnar shape, a polygonal columnar shape, a truncated cone shape, or a truncated polygonal pyramid shape.

As shown in FIGS. 1 and 2, the inductor component 1 has a magnetic layer 10, an insulating layer 15, a spiral wiring 21, vertical wirings 51 to 53, external terminals 41 to 43, and a coating film 50.

The spiral wiring 21 is made of a conductive material and wound on a plane. A normal direction relative to the plane of the wound spiral wiring 21 is defined as a Z direction (up-down direction) in the figures, and it is assumed in the following description that a forward Z direction faces toward the upper side while a reverse Z direction faces toward the lower side. The definition of the Z direction is the same in other embodiments and examples. The spiral wiring 21 is spirally wound in a clockwise direction from an inner circumferential end 21*a* toward an outer circumferential end 21*b* when viewed from the upper side.

The magnetic layer 10 is made of a magnetic material and is made up of a first magnetic layer 11, a second magnetic layer 12, an inner magnetic path part 13, and an outer magnetic path part 14. The first magnetic layer 11 and the second magnetic layer 12 are located at positions sandwiching the spiral wiring 21 from both sides in the Z direction (the normal direction relative to the plane of the wound spiral wiring 21). Specifically, the first magnetic layer 11 is located on the upper side of the spiral wiring 21, and the second magnetic layer 12 is located on the lower side of the spiral wiring 21. The inner magnetic path part 13 and the outer magnetic path part 14 are arranged on the inside and outside, respectively, of the spiral wiring 21 as shown in FIG. 1 and are connected to the first magnetic layer 11 and the second magnetic layer 12 as shown in FIG. 2. In this way, the magnetic layer 10 constitutes a closed magnetic path with respect to the spiral wiring 21. It is noted that although depicted in a distinguished manner in the figures, the first magnetic layer 11, the second magnetic layer 12, the inner magnetic path part 13, and the outer magnetic path part 14 may be integrated as the magnetic layer 10.

The insulating layer 15 is made of an insulating material and is disposed between the first magnetic layer 11 and the second magnetic layer 12 with the spiral wiring 21 embedded in the insulating layer 15. The insulating layer 15 is an insulating resin made of an inorganic filler and an organic resin. By covering the spiral wiring 21 with the insulating layer 15, insulation can reliably be ensured even if a gap is narrowed between wirings of the spiral wiring 21, so that a highly-reliable inductor component can be provided. Although FIG. 1 is the figure showing the magnetic layer 10 and the insulating layer 15 made transparent, the magnetic layer 10 and the insulating layer 15 may be transparent, translucent, or opaque, or may be colored.

The vertical wirings 51 to 53 are made of a conductive material and extend from the spiral wiring 21 in the Z direction to penetrate the inside of the first magnetic layer 11 or the second magnetic layer 12. The vertical wirings 51 to 53 include via conductors 25 extending from the spiral wiring 21 in the Z direction to penetrate the inside of the insulating layer 15 and columnar wirings 31 to 33 extending from the via conductors 25 in the Z direction to penetrate the inside of the first magnetic layer 11 or the second magnetic layer 12.

The first vertical wiring 51 includes the via conductor 25 extending upward from an upper surface of the inner circumferential end 21*a* of the spiral wiring 21, and the first columnar wiring 31 extending upward from the via conductor 25 to penetrate the inside of the first magnetic layer 11.

The second vertical wiring 52 and the third vertical wiring 53 are present on each of both sides in the Z direction sandwiching the spiral wiring 21. The second vertical wiring 52 includes the via conductor 25 extending upward from an upper surface of the outer circumferential end 21*b* of the spiral wiring 21, and the second columnar wiring 32 extending upward from the via conductor 25 to penetrate the inside of the first magnetic layer 11. The third vertical wiring 53 includes the via conductor 25 extending downward from a lower surface of the outer circumferential end 21*b* of the spiral wiring 21, and the third columnar wiring 33 extending downward from the via conductor 25 to penetrate the inside of the second magnetic layer 12.

The external terminals 41 to 43 are made of a conductive material and disposed on surfaces of the first magnetic layer 11 and the second magnetic layer 12. The external terminals 41 to 43 cover end surfaces of the vertical wirings 51 to 53, respectively. The "surfaces" are surfaces facing outside the inductor component 1, and the surface of the first magnetic layer 11 is the upper surface while the surface of the second magnetic layer 12 is the lower surface. The first external terminal 41 is disposed on the upper surface of the first magnetic layer 11 and covers the end surface of the vertical wiring 51 (the first columnar wiring 31) exposed from the upper surface. The second external terminal 42 and the third external terminal 43 are respectively present on both sides in the Z direction sandwiching the spiral wiring 21. The second external terminal 42 is disposed on the upper surface of the first magnetic layer 11 and covers the end surface of the vertical wiring 52 (the second columnar wiring 32) exposed from the upper surface. The third external terminal 43 is disposed on the lower surface of the second magnetic layer 12 and covers the end surface of the vertical wiring 53 (the third columnar wiring 33) exposed from the lower surface.

Preferably, a rust prevention treatment is applied to the external terminals 41 to 43. This rust prevention treatment refers to coating with Ni and Au or Ni and Sn etc. This enables the suppression of copper leaching due to solder and the rusting so that the inductor component 1 with high mounting reliability can be provided.

The coating film 50 is made of an insulating material and, as shown in FIG. 2, covers the upper surface of the first magnetic layer 11 and the lower surface of the second magnetic layer 12 while exposing the end surfaces of the vertical wirings 51 to 53 and the external terminals 41 to 43. In FIG. 1, the coating film 50 is not shown.

Regarding the area of the external terminals 41 to 43 viewed in the normal direction (Z direction), the first magnetic layer 11 is larger than the second magnetic layer 12. Specifically, the total area of the external terminals 41, 42 disposed on the surface of the first magnetic layer 11 is larger than the total area of the external terminal 43 disposed on the surface of the second magnetic layer 12. The external terminals may be disposed only on the first magnetic layer 11 out of the first magnetic layer 11 and the second magnetic layer 12, and in this case, the first magnetic layer 11 obviously becomes larger than the second magnetic layer 12 in terms of the area of the external terminals.

When A is the thickness of the first magnetic layer 11 and B is the thickness of the second magnetic layer 12, A/((A+B)/2) is 0.6 or more and 1.6 or less (i.e., from 0.6 to 1.6). In this case, since the relative relationship between the thickness of the first magnetic layer 11 and the thickness of the second magnetic layer 12 has a relatively large margin, even the adjustment can be made by grinding, for example. Additionally, an influence on the inductance value is small Therefore, even when the thinning is further performed, variation in the inductance value can be reduced.

In this case, the thickness of the inductor component 1 is preferably 0.35 mm or less. Therefore, the component can sufficiently be mounted even in applications requiring thinness such as smart cards.

The thickness of the first magnetic layer 11 is preferably greater than the thickness of the second magnetic layer 12. Therefore, when the external terminals 41, 42 on the first magnetic layer 11 side are connected to a land pattern of a mounting board, a leakage of a magnetic flux to the land pattern is reduced, and an eddy current is reduced in the conductor of the land pattern, so that the inductance can be restrained from decreasing due to the eddy current.

The thickness of the spiral wiring 21 is preferably greater than (A+B)/2 and less than 2(A+B). Therefore, even if the component is made thinner, the inductance can be ensured while reducing the DC resistance of the spiral wiring 21. Specifically, a power inductor used for converter applications makes a power loss of a converter larger when the DC resistance increases, leading to a reduction in efficiency, so that it is necessary to increase the cross-sectional area of the spiral wiring 21. Therefore, it is desired that the thickness of the spiral wiring 21 is sufficiently large. On the other hand, if the thickness of the spiral wiring 21 is made excessively large, the necessary thickness of the magnetic layers 11, 12 cannot be ensured for securing sufficient inductance in the case of the thin inductor component 1, so that an excessively large thickness is not preferable, and the formation within this range facilitates acquisition of desired characteristics on the assumption of the thin inductor component 1.

In this case, the thickness of the inductor component 1 is preferably 0.2 mm or less. Therefore, even the thin inductor component 1 can ensure the inductance while reducing the DC resistance of the spiral wiring 21.

According to the inductor component 1, the vertical wirings 51 to 53 extend from the spiral wiring 21 in the Z direction to penetrate the inside of the first magnetic layer 11 or the second magnetic layer 12. More specifically, the vertical wirings 51 to 53 include the via conductors 25 extending from the spiral wiring 21 in the Z direction to penetrate the inside of the insulating layer 15, and the columnar wirings 31 to 33 extending from the via conductors 25 in the Z direction to penetrate the inside of the first magnetic layer 11 or the second magnetic layer 12.

Therefore, the inductor component 1 has wirings directly led out from the spiral wiring 21 in the Z direction. This means that the spiral wiring 21 is led out through the shortest distance to the upper surface side or the lower surface side of the inductor component and means that unnecessary routing of wiring can be reduced in three-dimensional mounting in which a substrate wiring is connected from the upper surface side or the lower surface side of the inductor component 1. Thus, the inductor component 1 has a configuration sufficiently adaptable to the three-dimensional mounting and can improve a degree of freedom in circuit design.

Additionally, the inductor component 1 has no wiring led out in a direction toward a side surface from the spiral wiring 21 and therefore can achieve a reduction in the area of the inductor component 1 viewed in the Z direction, i.e., in the mounting area. Thus, the inductor component 1 can achieve a reduction in the mounting area required for both the surface mounting and the three-dimensional mounting and can improve the degree of freedom in circuit design.

Additionally, the inductor component 1 has the columnar wirings 31 to 33 penetrating the inside of the magnetic layer 10 and extending in the normal direction relative to the plane of the wound spiral wiring 21. In this case, a current flows through the columnar wirings 31 to 33 in the Z direction rather than the direction along the plane of the wound spiral wiring 21.

When the inductor component 1 is reduced in size, the magnetic layer 10 becomes relatively smaller and, particularly, the inner magnetic path part 13 is increased in magnetic flux density and more easily reaches the magnetic saturation. However, the magnetic flux caused by the Z-direction current flowing through the columnar wirings 31 to 33 does not pass through the inner magnetic path part 13, so that the influence on magnetic saturation characteristics, i.e., DC superimposition characteristics, can be reduced. In contrast, when a wiring is led out by a lead-out part from a spiral wiring toward a side surface (the side in the direction along the plane of the wound spiral wiring) as in conventional techniques, a portion of the magnetic flux generated by the current flowing through the lead-out part must pass through the inner magnetic path part and the outer magnetic path part, so that the magnetic saturation characteristics or DC superimposition characteristics are inevitably affected.

Since the columnar wirings 31 to 33 penetrate the inside of the first magnetic layer 11 or the second magnetic layer 12, opening portions of the magnetic layer 10 can be made small when the wirings are led out from the spiral wiring 21, and the closed magnetic path structure can easily be achieved. As a result, noise propagation toward the substrate can be suppressed.

Furthermore, since the inductor component 1 has the vertical wirings 51 to 53 respectively located on both sides in the Z direction sandwiching the spiral wiring 21, the wirings can respectively be led out on both sides in the Z direction sandwiching the spiral wiring 21. Specifically, for example, the inductor component 1 has the external terminals 41 to 43 respectively located on both sides in the Z direction sandwiching the spiral wiring 21. This is preferable for, for example, the three-dimensional mounting in which a substrate wiring can be connected from the upper and lower surface sides of the inductor component 1, because more options are available in a method of connecting the substrate wiring.

Furthermore, since the spiral wiring 21 is wound on a plane along the magnetic layer 10, the large inner magnetic path part 13 can be ensured regardless of thinning, so that the thin inductor component 1 having high magnetic saturation characteristics can be provided. In contrast, if an inductor component having a spiral wiring wound perpendicularly to the plane along the magnetic layer 10 is used, the coil diameter=the area of the magnetic layer decreases due to further thinning of the inductor component, i.e., the thinning in the thickness direction of the substrate. As a result, the magnetic saturation characteristics deteriorate, making it impossible to sufficiently energize the inductor.

The vertical wirings 51 to 53 and the external terminals 41 to 43 may be formed only in the first magnetic layer 11. A dummy terminal may be disposed as an external terminal disposed on the surface of the first magnetic layer 11 or the second magnetic layer 12 without electric connection to the spiral wiring 21. Since the dummy terminal is conductive and therefore has a high thermal conductivity, an improvement in heat dissipation enables the provision of the highly reliable (highly environmentally-resistant) inductor component 1. For example, if the dummy terminal is connected to a substrate wiring of a substrate (including an embedded type substrate), a heat dissipation path is formed from the dummy terminal through the substrate wiring, resulting in a further improvement in heat dissipation. If the dummy terminal is grounded, for example, if the dummy terminal is connected to a ground line of the substrate wiring, the dummy terminal can form an electrostatic shield to suppress propagation of static electricity to an external circuit and can prevent malfunction etc. due to noise. When the inductor component 1 is surface-mounted, the dummy terminal can be used for stabilizing the posture of the inductor component 1.

Furthermore, as shown in FIG. 2, the inductor component 1 includes the coating film 50 covering the surface of the first magnetic layer 11 or the second magnetic layer 12 while exposing the end surfaces of the vertical wirings 51 to 53. It is noted that the "exposing" includes not only exposing to the outside of the inductor component 1 but also exposing to another member.

Specifically, on the upper surface of the first magnetic layer 11, the coating film 50 covers a region excluding the external terminals 41, 42. On the lower surface of the second magnetic layer 12, the coating film 50 covers a region excluding the external terminals 43. In this way, the end surfaces of the vertical wirings 51 to 53 connected to the external terminals 41 to 43 are exposed from the coating film 50. Therefore, insulation can reliably be achieved between the adjacent external terminals 41, 42 (the vertical wirings 51, 52). As a result, the voltage resistance and the environmental resistance can be ensured in the inductor component 1. Since the regions of formation of the external terminals 41 to 43 formed on the surfaces of the magnetic layer 10 can arbitrarily be set in accordance with the shape of the coating film 50, a degree of freedom can be increased at the time of mounting, and the external terminals 41 to 43 can easily be formed.

In the inductor component 1, as shown in FIG. 2, the surfaces of the external terminals 41 to 43 are located on the outer side in the Z direction than the surface of the first magnetic layer 11 or the second magnetic layer 12. Specifically, the external terminals 41 to 43 are embedded in the coating film 50, and the surfaces of the external terminals 41 to 43 are not flush with the surface of the first magnetic layer 11 or the second magnetic layer 12. In this case, a positional relationship can independently be set between the surface of the magnetic layer 10 and the surfaces of the external terminals 41 to 43, so that a degree of freedom can be increased in the thickness of the external terminals 41 to 43. According to this configuration, the height positions of the surfaces of the external terminals 41 to 43 can be adjusted in the inductor component 1 and, for example, when the inductor component 1 is embedded in the substrate, the height positions can be made coincident with those of external terminals of another embedded component. Therefore, by using the inductor component 1, a laser focusing process can be rationalized at the time of via formation in the substrate, so that the manufacturing efficiency of the substrate can be improved.

Furthermore, in the inductor component 1, as shown in FIG. 1, the areas of the external terminals 41 to 43 covering the end surfaces of the vertical wirings 51 to 53 (the columnar wirings 31 to 33) are larger than the areas of the vertical wirings 51 to 53 (the columnar wirings 31 to 33) when viewed in the Z direction. Therefore, the bonding area at the time of mounting becomes larger, and the inductor component 1 is improved in the mounting reliability. Additionally, an alignment margin can be ensured for a bonding position between the substrate wiring and the inductor component 1 at the time of mounting on the substrate, so that the mounting reliability can be enhanced. In this case, since the mounting reliability can be improved regardless of the volume of the columnar wirings 31 to 33, the cross-sectional areas of the columnar wirings 31 to 33 viewed in the Z direction can be made smaller to suppress a reduction in volume of the first magnetic layer 11 or the second magnetic layer 12 and to restrain the characteristics of the inductor component 1 from degrading.

The spiral wirings 21, 22, the vertical wirings 51 to 53 (the via conductors 25, the columnar wirings 31 to 33), and the external terminals 41 to 43 are preferably conductors made of copper or a copper compound. This enables provision of the inexpensive inductor component 1 capable of reducing the DC resistance. By using copper as a main component, improvements can also be achieved in the bonding force and conductivity for the spiral wirings 21, 22, the vertical wirings 51 to 53, and the external terminals 41 to 43.

The inductor component 1 includes the insulating layer 15 disposed between the first magnetic layer 11 and the second magnetic layer 12 with the spiral wiring 21 embedded therein. Since this enables the inductor component 1 to eliminate the possibility of formation of an electrical short-circuit path through a magnetic material such as a metal magnetic substance between the wirings even when a space between the wirings is very narrow, the highly reliable inductor component can be provided. However, the insulating layer 15 may be made of a magnetic material to form a portion of the magnetic layer 10. Assuming that the chip size is the same, the volume of the magnetic layer 10 increases if the insulating layer 15 is a portion of the magnetic layer 10, so that the inductance value can be made higher. In this case, the vertical wirings 51 to 53 may be configured such that the via conductors 25 and the columnar wirings 31 to 33 are integrated without being distinguished from each other.

Although the inductor component 1 has one spiral wiring, the present disclosure is not limited to this configuration, and the inductor component 1 may include two or more spiral wirings 21, 22 wound on the same plane.

However, since the inductor component 1 has a higher degree of freedom in formation of the external terminals 41 to 43, the effect thereof becomes more remarkable in an inductor component having a larger number of external terminals.

EXAMPLE

An example of the inductor component 1 will be described.

The spiral wiring 21, the vertical wirings 51 to 53 (the via conductors 25, the columnar wirings 31 to 33), and the external terminals 41 to 43 are made of low resistance metal such as Cu, Ag, and Au, for example. Preferably, the spiral wiring 21 with a low resistance and a narrow pitch can inexpensively be formed by using copper plating formed by SAP (semi additive process). The spiral wiring 21, the vertical wirings 51 to 53, and the external terminals 41 to 43 may be formed by a plating method other than SAP, a sputtering method, a vapor deposition method, an application method, etc.

In this example, the spiral wiring 21 and the vertical wirings 51 to 53 are formed by copper plating with SAP, and the external terminals 41 to 43 are formed by electroless Cu plating. The spiral wiring 21, the vertical wirings 51 to 53 (the via conductors 25, the columnar wirings 31 to 33), and the external terminals 41 to 43 may all be formed by the same construction method.

The magnetic layer 10 (the first magnetic layer 11, the second magnetic layer 12, the inner magnetic path part 13, and the outer magnetic path part 14) is made of a resin containing a powder of a magnetic material, for example, and preferably contains a substantially spherical metal magnetic material. Therefore, the filling property of the magnetic material in the magnetic paths can be made favorable. As a result, the magnetic paths can be made smaller to provide the small-sized inductor component 1. However, the magnetic layer may be made of a resin containing a powder of a magnetic material such as ferrite or may be formed by sintering a ferrite substrate or a green sheet of a magnetic material.

In this example, the resin constituting the magnetic layer 10 is an organic insulating material made of an epoxy resin, bismaleimide, liquid crystal polymer, or polyimide, for example. The magnetic material powder of the magnetic layer 10 is a metal magnetic substance having an average particle diameter of 5 μm or less. The metal magnetic substance is, for example, an FeSi alloy such as FeSiCr, an FeCo alloy, an Fe alloy such as NiFe, or an amorphous alloy thereof. The content percentage of the magnetic material is preferably 50 vol % or more and 85 vol % or less (i.e., from 50 vol % to 85 vol %) relative to the whole magnetic layer 10.

By using a magnetic material having a small particle diameter such as an average particle diameter of 5 μm or less as described above, an eddy current generated in a metal magnetic substance can be suppressed so as to provide the inductor component 1 with a smaller loss even at a high frequency such as tens of MHz. By using an Fe-based magnetic material, larger magnetic saturation characteristics can be acquired as compared to ferrite etc.

By setting a filling amount of the magnetic material to 50 vol % or more, the magnetic permeability can be increased and the number of turns of a spiral wiring required for acquiring a desired inductance value can be reduced so as to decrease loss at high frequency due to a direct-current resistance and a proximity effect. Furthermore, when the filling amount is 85 vol % or less, since the volume of the organic insulating resin is sufficiently large with respect to the magnetic material and the flowability of the magnetic material can be ensured, the filling property is improved so that the effective magnetic permeability and the strength of the magnetic material itself can be increased.

On the other hand, when used at low frequency, it is not necessary to be concerned about the eddy current loss as compared to the case of high frequency, so that the average magnetic particle size of the metal magnetic substance may be increased to make the magnetic permeability higher. For example, a magnetic material preferably has large particles with an average particle size of 100 to 30 μm mixed with some small particles (10 μm or less) to fill gaps between the large particles. This can make the filling amount higher to implement a magnetic material with high magnetic permeability at a frequency such as 1 to 10 MHz. However, at a frequency of 1 MHz or more, the relative magnetic permeability is preferably 70 or less for suppression of influence of the eddy current loss.

In this example, the coating film 50 is formed of a photosensitive resist or a solder resist made of an organic insulating resin such as polyimide, phenol, an epoxy resin, etc. The rust prevention treatment applied to the surfaces of the external terminals 41 to 43 is plating of Ni, Au, Sn, etc.

In this example, the insulating layer 15 is made of a resin containing an $SiO_2$ filler having an average particle diameter of 0.5 μm or less, for example. However, the filler is not an essential constituent element of the insulating layer 15. The periphery of the spiral wiring 21 is covered with the insulating layer 15 as in this example so that the spiral wiring 21 is not in contact with the magnetic material in this configuration; however, since the magnetic material itself has insulating properties, the wiring may not necessary be covered with the insulating layer 15.

Assuming that the chip size is the same, if the wiring is not covered with the insulating layer 15, the volume of the magnetic material increases, so that the inductance value can be made higher. On the other hand, covering the spiral wiring 21 with the insulating layer 15 as in this example can eliminate the possibility of formation of a path of an electrical short-circuit through the metal magnetic material between wirings of the spiral wiring 21 when the inter-wiring space of the spiral wiring 21 is very narrow, so that the highly reliable inductor component 1 can be provided.

In this example, the spiral wiring 21 has the wiring width of 60 μm, the inter-wiring space of 10 μm, and the wiring thickness of 70 μm. The inter-wiring space is preferably 20 μm or less and 3 μm or more (i.e., from 20 μm to 3 μm). By setting the inter-wiring space to 20 μm or less, the wiring width can be made larger, so that the direct-current resistance can be lowered. By setting the inter-wiring space to 3 μm or more, sufficient insulation can be kept between the wirings.

The wiring thickness is preferably 40 μm or more and 120 μm or less (i.e., from 40 μm to 120 μm). By setting the wiring thickness to 40 μm or more, the direct-current resistance can sufficiently be lowered. By setting the wiring thickness to 120 μm or less, a wiring aspect is prevented from becoming extremely large, and process variations can be suppressed.

The insulating layer 15 has the thickness of 10 μm between the spiral wiring 21 and the first magnetic layer 11 and between the spiral wiring 21 and the second magnetic layer 12, and the insulating layer 15 has the thickness of 25 μm between the inner magnetic path part 13 and the spiral wiring 21. The insulating layer 15 preferably has a width of 3 μm or more and 20 μm or less (i.e., from 3 μm to 20 μm) between the spiral wiring 21 and the first magnetic layer 11 or the second magnetic layer 12. By keeping a distance of 3 μm or more, the spiral wiring 21 can reliably be prevented from coming into contact with the first magnetic layer 11 and the second magnetic layer 12, and the thinning of the inductor component 1 can be achieved by setting the distance to 20 μm or less.

The insulating layer 15 preferably has a width of 3 μm or more and 50 μm or less (i.e., from 3 μm to 50 μm) between the inner magnetic path part 13 and the spiral wiring 21. By keeping a distance of 3 μm or more, the spiral wiring 21 can reliably be prevented from coming into contact with the inner magnetic path part 13, and by setting the distance to 50 μm or less, the inner magnetic path part 13 or the outer magnetic path part 14 can be made wider, so that the magnetic saturation characteristics are improved and the inductance value can be made higher.

In this embodiment, the number of turns of the spiral wiring 21 is 2.5. The number of turns is preferably five or less. If the number of turns is five or less, the loss of the proximity effect can be reduced for a high-frequency switching operation such as from 50 MHz to 150 MHz. On the other hand, in the case of use in a low frequency switching operation at 1 MHz etc., the number of turns is preferably 2.5 or more. By increasing the number of turns, the inductance can be made higher to reduce an inductor ripple current.

In this embodiment, the thickness of the first magnetic layer 11 is 117.5 μm, and the thickness of the second magnetic layer 12 is 67.5 μm. The first magnetic layer 11 and the second magnetic layer 12 preferably each have a thickness of 10 μm or more and 200 μm or less (i.e., from 10 μm to 200 μm). If the thickness of the first and second magnetic layers 11, 12 is too thin, the spiral wiring 21 may be exposed due to process variations during grinding of the first and second magnetic layers 11, 12. If the thickness of the first and second magnetic layers 11, 12 is small with respect to the average particle diameter of the magnetic material contained in the first and second magnetic layers 11, 12, the effective magnetic permeability is significantly reduced due to shedding of particles. By setting the thickness of the first and second magnetic layers 11, 12 to 200 μm or less, the inductor component can be formed into a thin film. As in this embodiment, the first and second magnetic layers 11, 12 may be different in thickness, and when A is the thickness of the first magnetic layer 11 having a large area of the external terminals and B is the thickness of the second magnetic layer 12, (A/(A+B)/2) is preferably in the range of 0.6 to 1.6.

In this case, since the relative relationship between the thickness of the first magnetic layer 11 and the thickness of the second magnetic layer 12 has a relatively large margin, even the adjustment can be made by grinding, for example. Additionally, as described alter, an influence on the inductance value is small. Moreover, since the correlative relationship between the thicknesses of the first and second magnetic layers 11, 12 has a relatively large margin, a narrow deviation can be achieved in the thickness of the inductor component 1. Specifically, because of a high degree of freedom in setting the thicknesses of the first and second magnetic layers 11, 12, for example, the thicknesses of the magnetic layers 11, 12 can absorb variations in thickness generated due to processing such as variations in thickness of the spiral wiring 21 and variations in thickness of the insulating layer 15, thereby resulting in a narrower deviation in the thickness of the inductor component 1.

The thickness of the first magnetic layer 11 is preferably greater than the thickness of the second magnetic layer 12. The inductor component 1 has the first magnetic layer 11 larger than the second magnetic layer 12 in terms of the area of the external terminals 41 to 43 viewed in the normal direction (Z direction). Therefore, in the inductor component 1, the magnetic flux in the first magnetic layer 11 is more likely to be blocked by the external terminals 41 to 43 as compared to the magnetic flux in the second magnetic layer 12. Thus, by increasing the thickness on the first magnetic layer 11 side to place a distance from the external terminals 41 to 43 and reduce the influence of the external terminals 41 to 43, the sensitivity of the inductance to variations in the magnetic layer thickness (chip thickness) can be reduced, and the inductor component having inductance with narrow deviation can be provided. In general, on the first magnetic layer 11 side having a larger area of the external terminals 41 to 43, an area of a land pattern is larger on the board side on which the inductor component 1 is mounted/incorporated, and the number of surrounding electronic components also tends to be larger. Therefore, by increasing the thickness of the first magnetic layer 11 to reduce a magnetic flux leakage, the adverse effects due to the magnetic flux leakage can effectively be reduced in terms of eddy current loss due to the land pattern, noise made incident on surrounding electronic components, etc.

The thickness of the external terminals 41 to 43 including the rust prevention treatment is made up of the electroless copper plating thickness of 5 μm, the Ni plating thickness of 5 μm, and the Au plating thickness of 0.1 μm. The thickness of the coating film 50 is 5 μm. For these thicknesses, a thickness and a size may appropriately be selected from the viewpoint of chip thickness and mounting reliability as well.

From the above, according to this example, the thin inductor having the chip size of 1210 (1.2 mm×1.0 mm) and the thickness of 0.300 mm can be provided.

(Simulation Result)

Figure 3A:
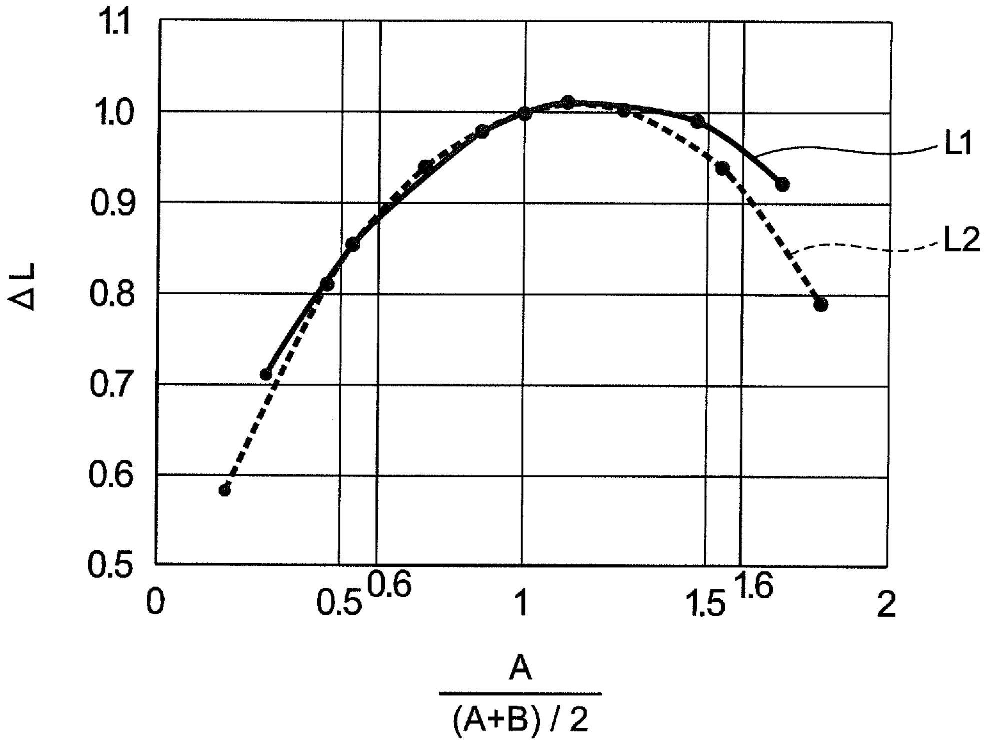
FIG. 3A is a graph showing a first simulation result of the inductor component according to the first embodiment.

Description will hereinafter be made of a simulation result based on the configuration of the inductor component 1 performed to demonstrate the effect in the configuration of the inductor component 1. FIG. 3A shows a first simulation result. FIG. 3A shows a relationship between (A/(A+B)/2) and inductance change (ΔL) when the chip thickness is changed. The simulation conditions will be described. For a simulator, the electromagnetic field simulator HFSS@synopsis is used. The magnetic permeability μ of the magnetic material is 8.9; the L-acquisition frequency is 100 MHz; the chip size is 1.2 mm×1.0 mm; the number of turns of the spiral wiring 21 is 2.5; and the spiral wiring L/S/t is 60 μm/10 μm/70 μm. A graph L1 shows when the chip thickness is 0.200 mm, and a graph L2 shows when the chip thickness is 0.300 mm. As shown in FIG. 3A, when (A/(A+B)/2) is in the range of 0.6 to 1.6, the inductance change can be suppressed to a reduction of 10%.

Figure 3B:
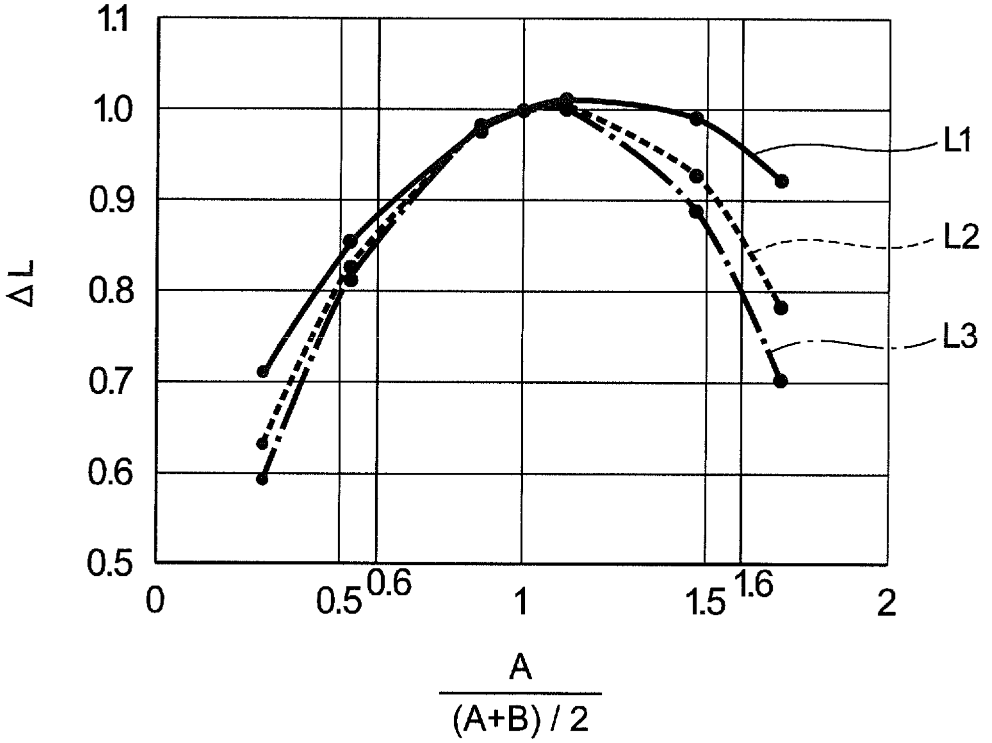
FIG. 3B is a graph showing a second simulation result of the inductor component according to the first embodiment.

FIG. 3B shows a second simulation result. FIG. 3B shows a relationship between (A/(A+B)/2) and the inductance change (ΔL) when the magnetic permeability of the magnetic material is changed. The simulation conditions will be described. For a simulator, the electromagnetic field simulator HFSS@synopsis is used. The L-acquisition frequency is 100 MHz; the chip size is 1.2 mm×1.0 mm; the chip thickness is 0.200 mm; the number of turns of the spiral wiring 21 is 2.5; and the spiral wiring L/S/t is 60 μm/10 μm/70 μm. A graph L1 shows when the magnetic permeability μ of the magnetic material is 8.6, a graph L2 shows when the magnetic permeability μ of the magnetic material is 26.5, and a graph L3 shows when the magnetic permeability μ of the magnetic material is 70. As shown in FIG. 3B, when (A/(A+B)/2) is in the range of 0.6 to 1.6, the inductance change can be suppressed to a reduction of 20%.

(Manufacturing Method)

A manufacturing method of the inductor component 1 will be described.

Figure 4A:
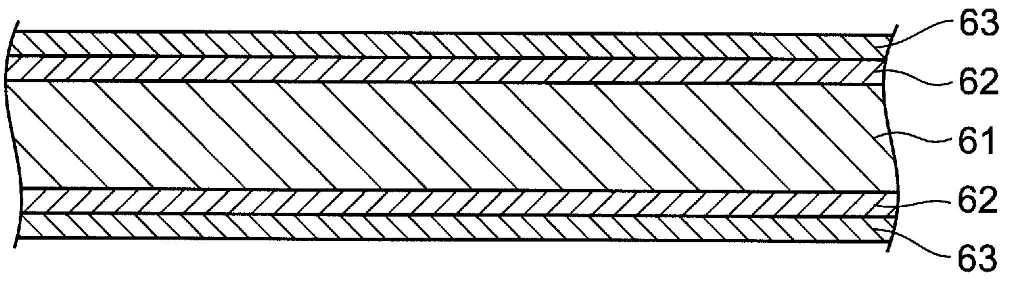
FIG. 4A is an explanatory view for explaining a manufacturing method of the inductor component according to the first embodiment.

A dummy core substrate 61 is prepared as shown in FIG. 4A. The dummy core substrate 61 has a substrate copper foil on both sides. In this embodiment, the dummy core substrate 61 is a glass epoxy substrate. Since the thickness of the dummy core substrate 61 does not affect the thickness of the inductor component, the substrate with easy-to-handle thickness may appropriately be used for the reason of warpage due to processing etc.

A copper foil 62 is then bonded onto a surface of the substrate copper foil. The copper foil 62 is bonded to a smooth surface of the substrate copper foil. Therefore, an adhesion force can be made weak between the copper foil 62 and the substrate copper foil and, at a subsequent step, the dummy core substrate 61 can easily be peeled from the copper foil 62. Preferably, an adhesive bonding the dummy core substrate 61 and the dummy metal layer (the copper foil 62) is an adhesive with low tackiness. For weakening of the adhesion force between the dummy core substrate 61 and the copper foil 62, it is desirable that the bonding surfaces of the dummy core substrate 61 and the copper foil 62 are glossy surfaces.

Subsequently, an insulating layer 63 is laminated on the copper foil 62. In this case, the insulating layer 63 is thermally press-bonded and thermally cured by a vacuum laminator, a press machine, etc.

Figure 4B:
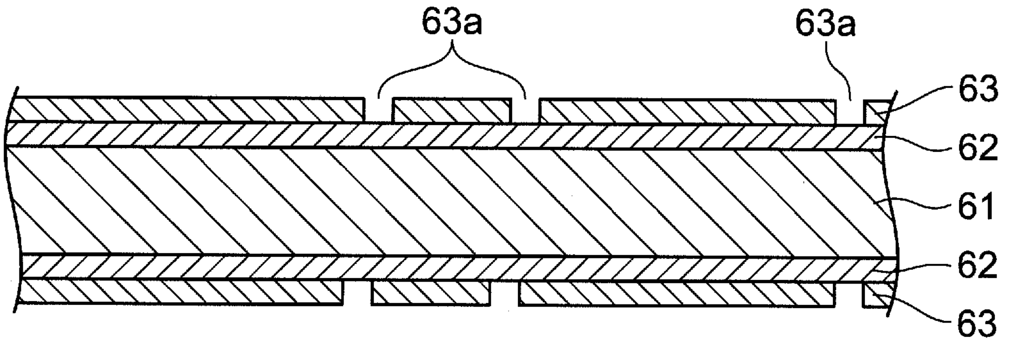
FIG. 4B is an explanatory view for explaining the manufacturing method of the inductor component according to the first embodiment.
Figure 4C:
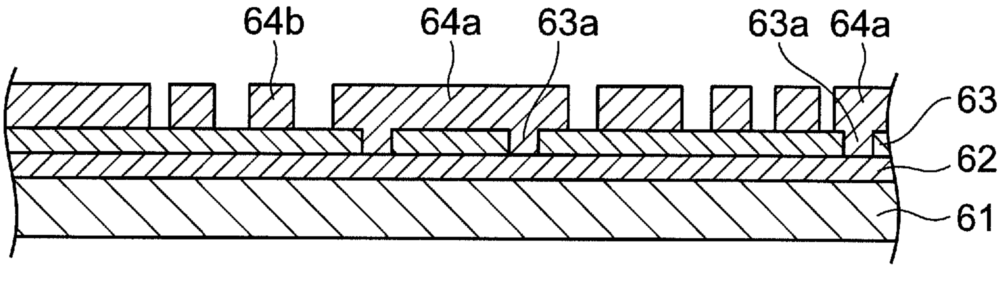
FIG. 4C is an explanatory view for explaining the manufacturing method of the inductor component according to the first embodiment.

As shown in FIG. 4B, an opening part 63*a* is formed by laser processing etc. in the insulating layer 63. As shown in FIG. 4C, a dummy copper 64*a* and a spiral wiring 64*b* are formed on the insulating layer 63. Specifically, a power supply film (not shown) for SAP is formed on the insulating layer 63 by electroless plating, sputtering, vapor deposition, etc. After formation of the power feeding film, a photosensitive resist is applied or pasted onto the power feeding film, and the opening part of the photosensitive resist is formed in a place serving as a wiring pattern by photolithography. Subsequently, a metal wiring corresponding to the dummy copper 64*a* and the spiral wiring 64*b* is formed in the opening part of the photosensitive resist layer. After the formation of the metal wiring, the photosensitive resist is peeled and removed by a chemical liquid, and the power feeding film is etched and removed. This metal wiring is subsequently used as a power feeding part to acquire narrow-space wirings by applying additional copper electrolytic plating. The opening part 63*a* formed by SAP in FIG. 4B is filled with copper.

Figure 4D:
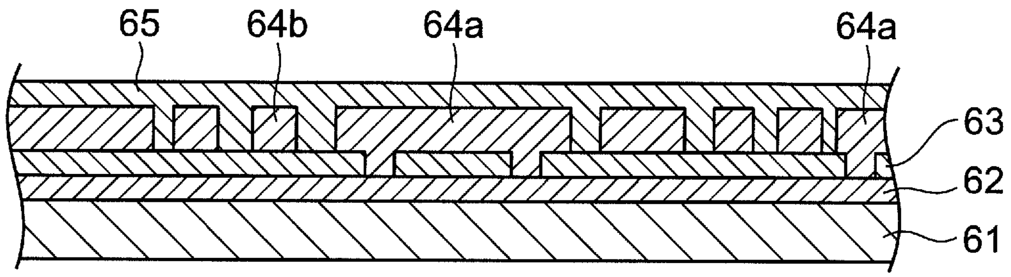
FIG. 4D is an explanatory view for explaining the manufacturing method of the inductor component according to the first embodiment.

As shown in FIG. 4D, the dummy copper 64*a* and the spiral wiring 64*b* are covered with an insulating layer 65. The insulating layer 65 is thermally press-bonded and thermally cured by a vacuum laminator, a press machine, etc.

Figure 4E:
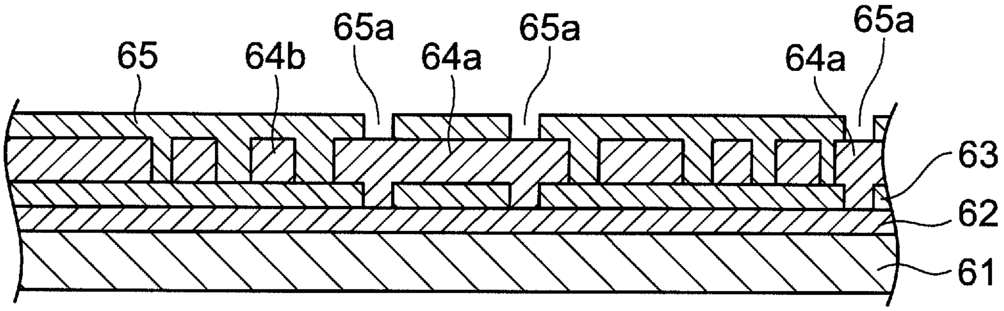
FIG. 4E is an explanatory view for explaining the manufacturing method of the inductor component according to the first embodiment.

As shown in FIG. 4E, an opening part 65*a* is then formed in the insulating layer 65 by laser processing etc.

Figure 4F:
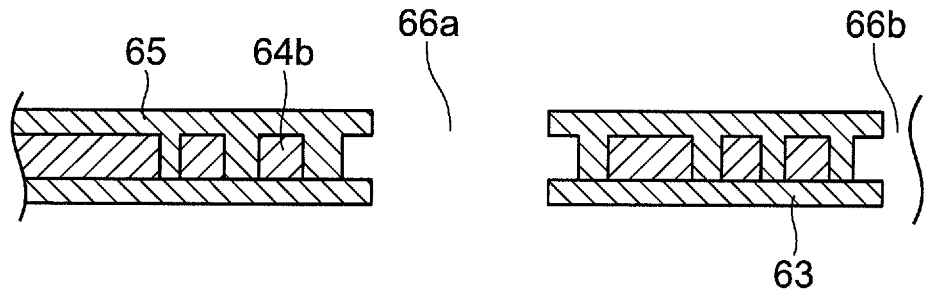
FIG. 4F is an explanatory view for explaining the manufacturing method of the inductor component according to the first embodiment.

Subsequently, the dummy core substrate 61 is peeled off from the copper foil 62. The copper foil 62 is removed by etching etc., and the dummy copper 64*a* is removed by etching etc., before forming a hole part 66*a* corresponding to the inner magnetic path part 13 and a hole part 66*b* corresponding to the outer magnetic path part 14 as shown in FIG. 4F.

Figure 4G:
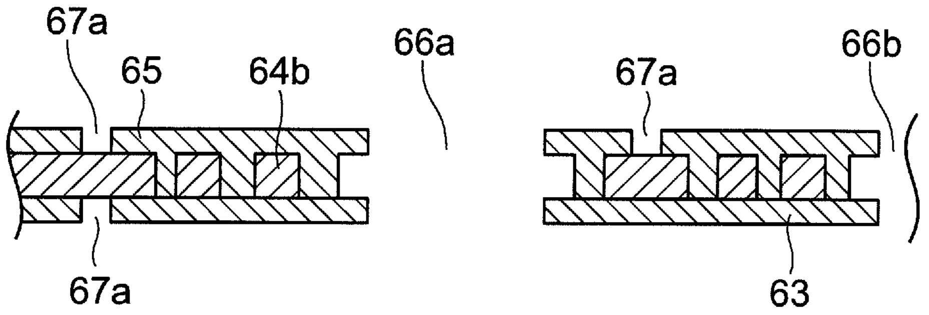
FIG. 4G is an explanatory view for explaining the manufacturing method of the inductor component according to the first embodiment.
Figure 4H:
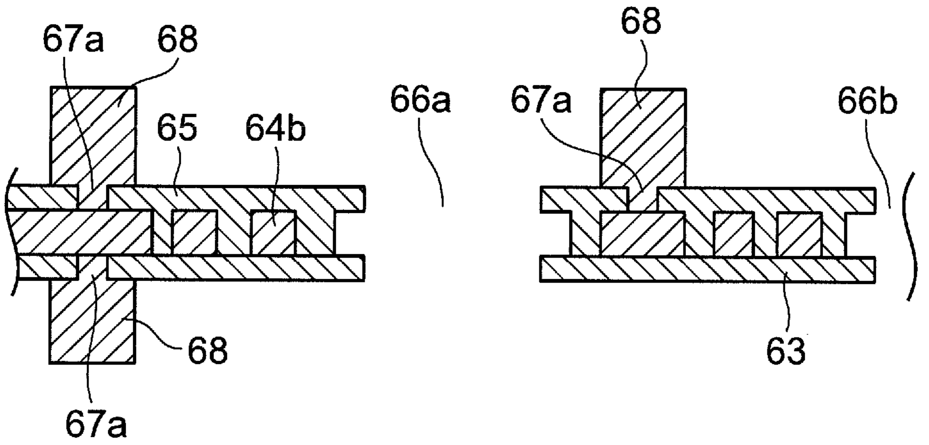
FIG. 4H is an explanatory view for explaining the manufacturing method of the inductor component according to the first embodiment.

Subsequently, as shown in FIG. 4G, an insulating layer opening part 67*a* is formed by laser processing etc. As shown in FIG. 4H, the insulating layer opening part 67*a* is then filled with copper by SAP and a columnar wiring 68 is formed on the insulating layer 67.

Figure 4I:
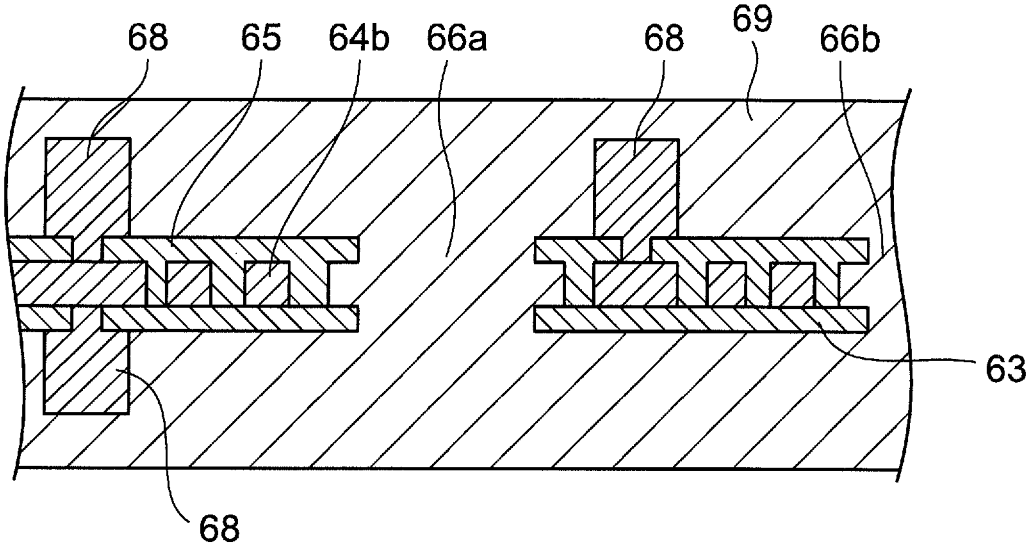
FIG. 4I is an explanatory view for explaining the manufacturing method of the inductor component according to the first embodiment.

As shown in FIG. 4I, the spiral wiring, the insulating layer, and the columnar wiring are covered with a magnetic material (magnetic layer) 69 to form an inductor substrate. The magnetic material 69 is thermally press-bonded and thermally cured by a vacuum laminator, a press machine, etc. At this time, the magnetic material 69 is also filled into the hole parts 66*a*, 66*b*.

Figure 4J:
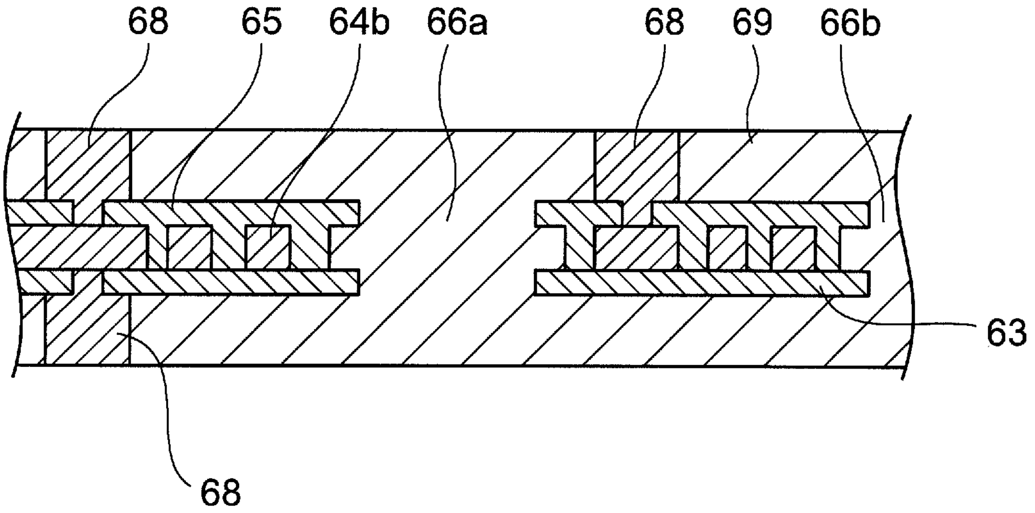
FIG. 4J is an explanatory view for explaining the manufacturing method of the inductor component according to the first embodiment.

As shown in FIG. 4J, the magnetic material 69 on the upper and lower sides of the inductor substrate is reduced in thickness by a grinding method. In this case, the columnar wiring 68 is partially exposed so that an exposed portion of the columnar wiring 68 is formed on the same plane as the magnetic material 69. In this case, by grinding the magnetic material 69 to a thickness sufficient for acquiring an inductance value, the inductor component can be made thinner.

Figure 4K:
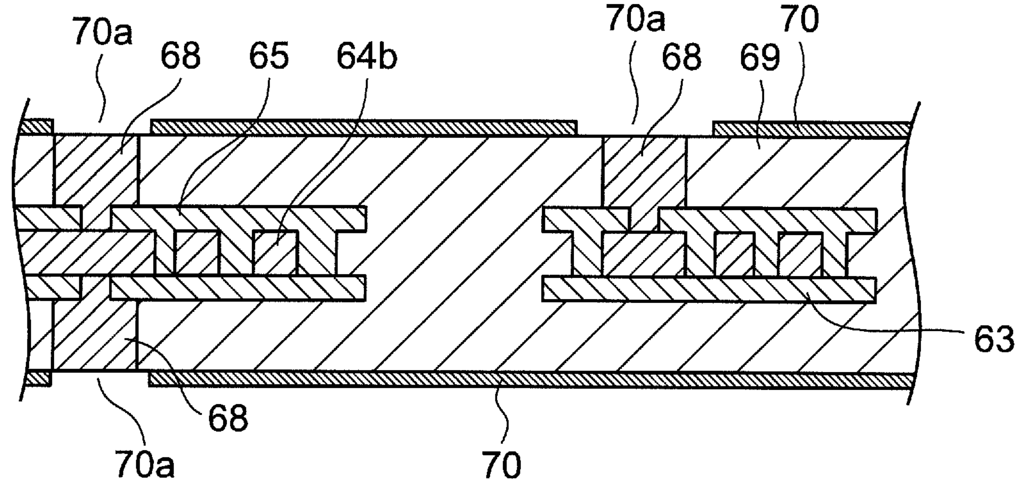
FIG. 4K is an explanatory view for explaining the manufacturing method of the inductor component according to the first embodiment.

Subsequently, as shown in FIG. 4K, an insulating resin (coating film) 70 is formed on a magnetic substance surface by a printing method. An opening part 70*a* of the insulating resin 70 is used as a portion for formation of an external terminal. Although the printing method is used in this example, the opening part 70*a* may be formed by a photolithography method.

Figure 4L:
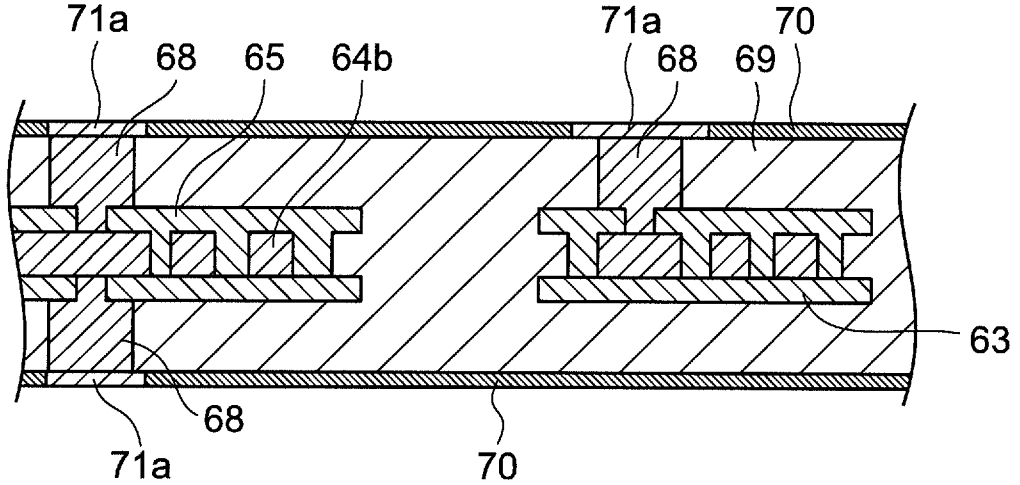
FIG. 4L is an explanatory view for explaining the manufacturing method of the inductor component according to the first embodiment.
Figure 4M:
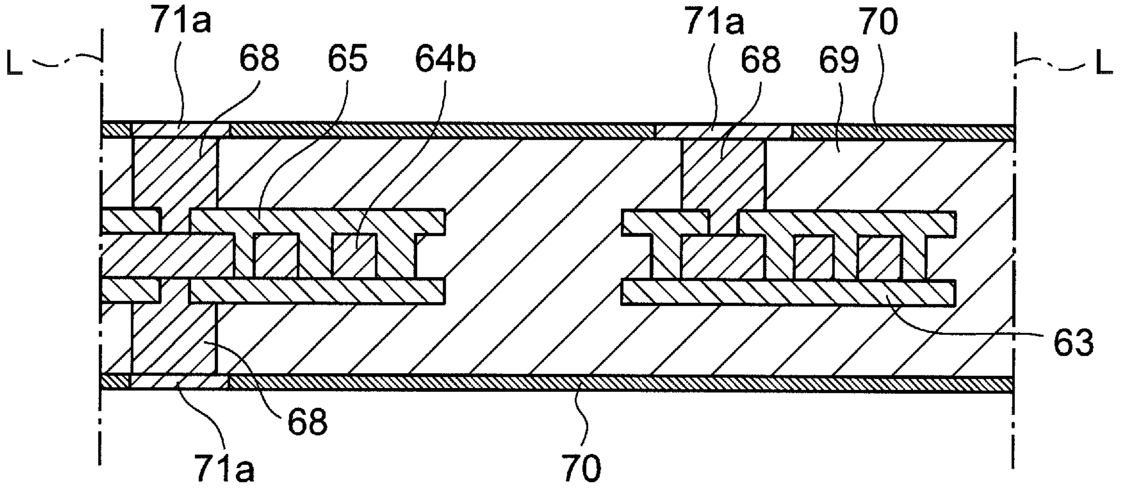
FIG. 4M is an explanatory view for explaining the manufacturing method of the inductor component according to the first embodiment.

As shown in FIG. 4L, an electroless copper plating or a plating film of Ni and Au etc. is applied to form an external terminal 71*a* and, as shown in FIG. 4M, dicing is performed along broken line portions L to form individual pieces so as to acquire the inductor component of FIG. 2. Although not shown after FIG. 4B, the inductor substrates may be formed on both surfaces of the dummy core substrate 61. As a result, higher productivity can be achieved.

In this embodiment, the external terminal is also disposed on the second magnetic layer 12 side; however, if no external terminal is disposed on the second magnetic layer 12 side, the insulating resin 70 is not disposed on the lower surface of the magnetic material 69 as shown in FIG. 4K.

Second Embodiment

Figure 5:
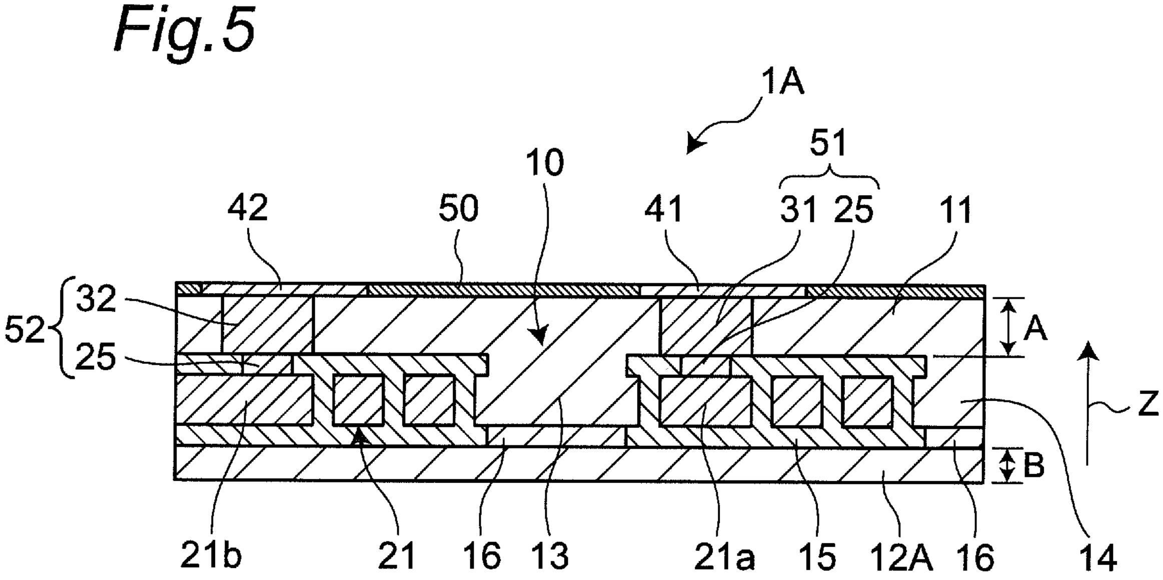
FIG. 5 is a cross-sectional view of an inductor component according to a second embodiment.

FIG. 5 is a cross-sectional view of an inductor component. The second embodiment is different from the first embodiment in the configuration of the second magnetic layer. This different configuration will hereinafter be described. In the second embodiment, the same constituent elements as the first embodiment are denoted by the same reference numerals as the first embodiment and therefore will not be described.

As shown in FIG. 5, in an inductor component 1A, the magnetic permeability of a second magnetic layer 12A is higher than the magnetic permeability of the first magnetic layer 11. Therefore, the acquisition efficiency of inductance can be made higher. In this case, a thickness A of the first magnetic layer 11 is preferably greater than a thickness B of the second magnetic layer 12A. As a result, even if the thickness B of the second magnetic layer 12A is small, the magnetic permeability of the second magnetic layer 12A is high so that a leakage magnetic flux hardly occurs, and furthermore, since the thickness of the first magnetic layer 11 is large, a leakage magnetic flux hardly occurs also on the first magnetic layer 11 side.

A method of analyzing the magnetic permeability will be described. A magnitude of the magnetic permeability can be evaluated by the following first, second, or third analysis method. The first or second analysis method is basically used for measurement, and only when the first or second analysis method cannot be used, the third analysis method is used for measurement.

For the first analysis method, when the magnetic material can be obtained in a form of liquid, a sheet, etc., the material can be processed into a sheet, a plate, or a block shape, and the magnetic permeability can be acquired by a known impedance measurement method.

For the second analysis method, for example, an inductance of a chip is measured from a chip state, and one surface of a magnetic layer is then removed by grinding, etching, etc., before measuring the inductance again. Subsequently, effective magnetic permeability serving as inductance corresponding to each state can be obtained through electromagnetic-field simulation (e.g., HFSS of Ansys) for comparison of the magnetic permeability from the chip state.

For the third analysis method, determination can be made from a cross section of an SEM image based on general known knowledge. For example, from a result of EDX analysis, if magnetic powder of the same material system is used, the magnetic permeability is higher in a magnetic material having a larger amount of magnetic powder with large particle diameter than a magnetic material having a smaller amount thereof. The SEM image to be acquired may be obtained from a cross section taken by cutting the center on the longitudinal side of the chip. The magnification of the SEM image is preferably 200 to 2000 times.

The vertical wirings 51, 52 do not exist inside the second magnetic layer 12A. In this case, the acquisition efficiency of inductance is increased by not forming a vertical wiring, which reduces the volume of the magnetic material, in the second magnetic layer 12A having the magnetic permeability higher than the first magnetic layer 11. In the second magnetic layer 12A, since the magnetic permeability is higher than the first magnetic layer 11 and a proportion (volume) of the magnetic material is therefore larger in the magnetic layer, shedding of particles or a loss of the magnetic material easily occurs due to processing, and the shedding of particles or the loss more significantly affects the inductance. In other words, since the second magnetic layer 12A is more significantly affected by processing than the first magnetic layer 11, the yield can be increased by not forming a vertical wiring in the second magnetic layer 12A.

The first magnetic layer 11 is preferably a composite material of an inorganic filler made of an FeSi- or FeCo- or FeAl-based alloy or an amorphous alloy thereof and an epoxy- or polyimide- or phenol-based organic resin; the content percentage of the inorganic filler is preferably 50 vol % or more based on the organic resin; and the inorganic filler is preferably substantially spherical.

Therefore, since the first magnetic layer 11 is a composite material of an inorganic filler and an organic resin, and the content percentage of the inorganic filler is 50 vol % or more, even if the vertical wirings 51, 52 are disposed in the first magnetic layer 11, both magnetic characteristic and workability can be satisfied. Since the inorganic filler is substantially spherical, when the vertical wirings 51, 52 are disposed in the first magnetic layer 11, the vertical wirings 51, 52 are easily filled in a slipping manner in the first magnetic layer 11.

Figure 6:
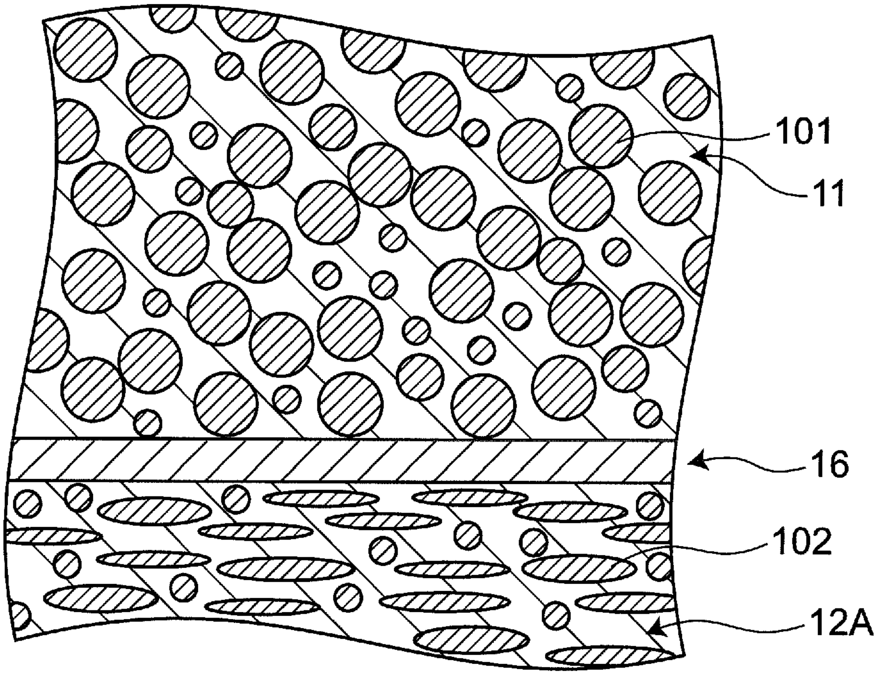
FIG. 6 is an enlarged cross-sectional view of the inductor component according to the second embodiment.

FIG. 6 is an enlarged view of the inductor component 1A. As shown in FIG. 6, at least a portion between the first magnetic layer 11 and the second magnetic layer 12A includes a region in which an amount of magnetic powders (inorganic fillers) 101, 102 is smaller as compared to the first magnetic layer 11 and the second magnetic layer 12. This region may be composed of a resin component contained in the first magnetic layer 11 and a resin component contained in the second magnetic layer 12A or may be composed of a resin different from the resin components contained in the first magnetic layer 11 and the second magnetic layer 12A. This region will hereinafter be referred to as a resin layer 16.

The resin layer 16 may contain no magnetic powder or may contain a magnetic powder as long as the existing amount of the magnetic powder present is smaller as compared to the first magnetic layer 11 and the second magnetic layer 12A. The magnetic powder contained in the resin layer 16 may be the same as the magnetic powder contained in the first and second magnetic layers 11, 12A.

Therefore, since the resin layer 16 exists between the first magnetic layer 11 and the second magnetic layer 12A, the adhesion is improved between the first magnetic layer 11 and the second magnetic layer 12A, and the inductor component 1A can be improved in the strength of the magnetic layer 10. Additionally, by disposing the resin layer 16 with a smaller amount or the magnetic powder, the magnetic saturation characteristics may be improved.

When the thickness of the resin layer 16 is larger, the adhesion and the magnetic saturation characteristics are more improved; however, if the thickness of the resin layer 16 is too large, the acquisition efficiency of inductance may decrease. The thickness of the resin layer 16 is preferably 0.5 μm or more and 30 μm or less (i.e., from 0.5 μm to 30 μm). When the thickness of the resin layer 16 is 0.5 μm or more, the adhesion between the first magnetic layer 11 and the second magnetic layer 12A can further be improved, and the magnetic saturation characteristics can further be improved. When the thickness of the resin layer 16 is 30 μm or less, the adhesion and the magnetic saturation characteristics are improved, and at the same time, the decrease in the acquisition efficiency of inductance can be suppressed.

The first magnetic layer 11 includes the substantially spherical magnetic powder 101, and the second magnetic layer 12A includes the flattened magnetic powder 102. In the second magnetic layer 12A, the flattened magnetic powder 101 has the major axis arranged along a direction orthogonal to the normal direction (Z direction). As a result, in the second magnetic layer 12A, the magnetic flux flows along the direction orthogonal to the normal direction (Z direction). Therefore, the second magnetic layer 12A has the magnetic permeability higher than that of the first magnetic layer 11.

Different materials or highly-filled materials may be used for the first and second magnetic layers 11, 12A. Alternatively, a gradient of the filling amount of the magnetic powder may be formed in the first and second magnetic layers 11, 12A to make the effective magnetic permeability higher in the second magnetic layer 12A than the first magnetic layer 11.

Third Embodiment (Configuration)

Figure 7A:
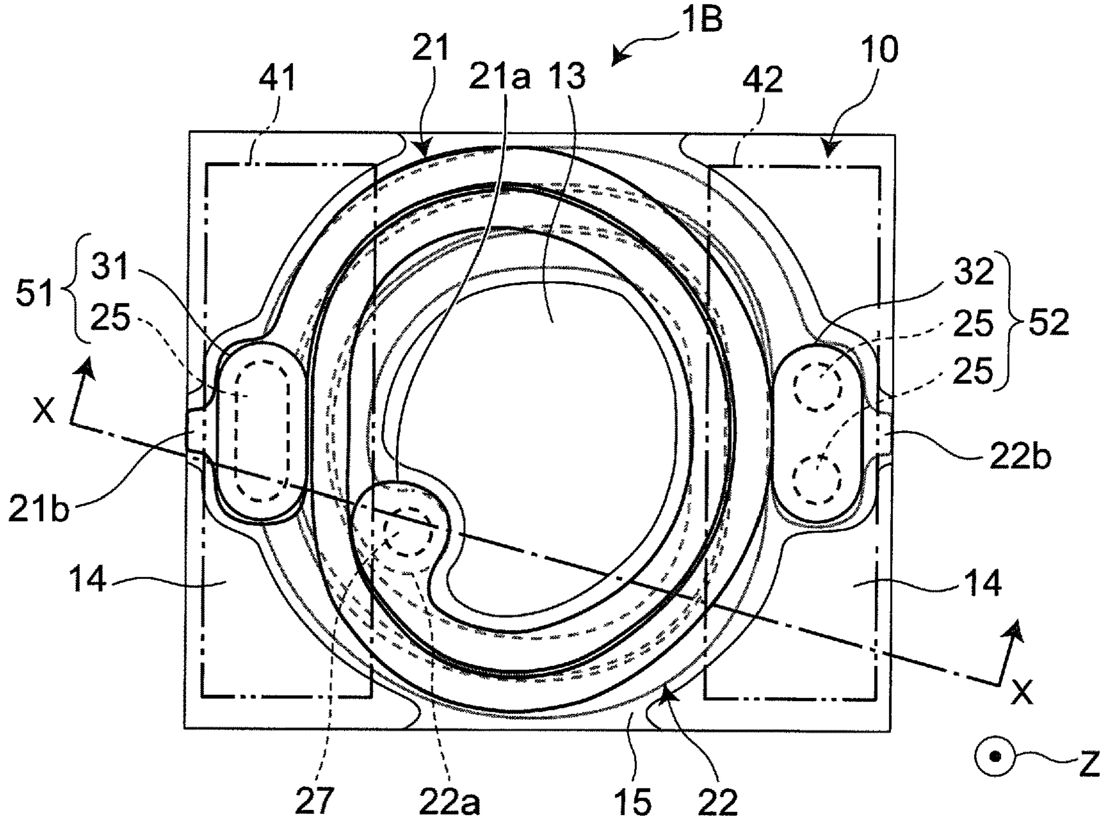
FIG. 7A is a transparent plane view of an inductor component according to a third embodiment.
Figure 7B:
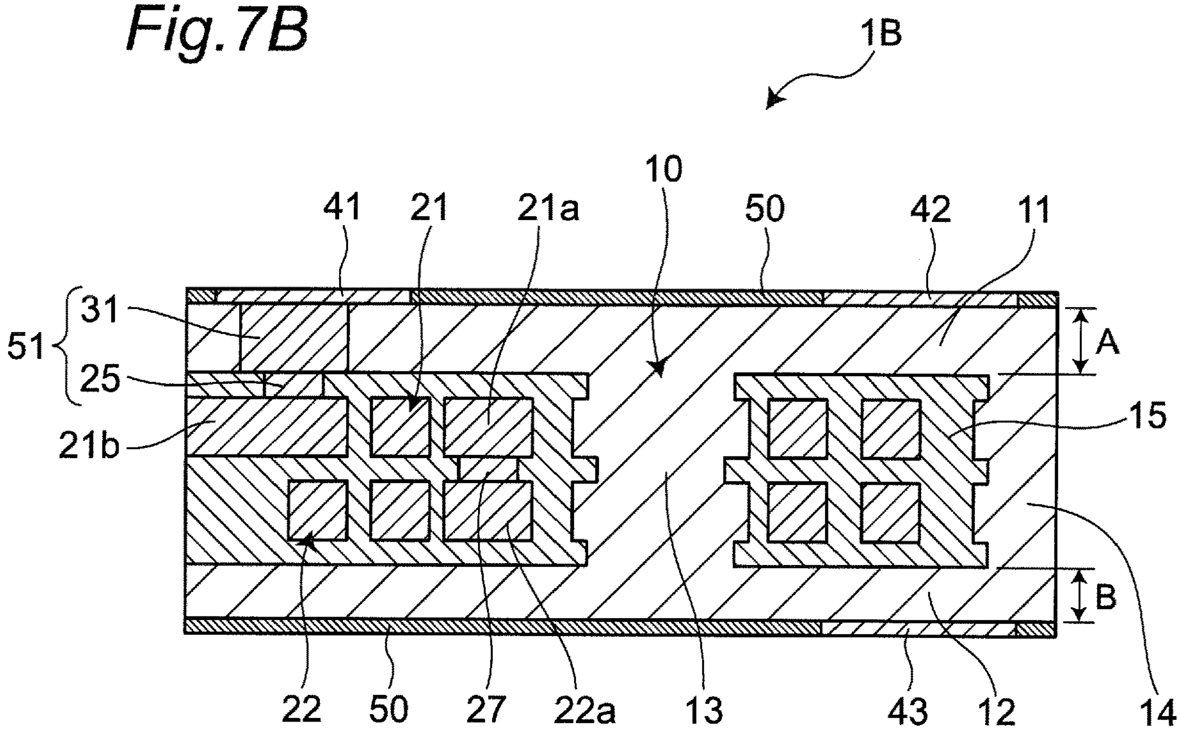
FIG. 7B is a cross-sectional view of the inductor component according to the third embodiment.

FIG. 7A is a transparent plane view of a third embodiment of the inductor component. FIG. 7B is a cross-sectional view taken along X-X of FIG. 7A. The third embodiment is different from the first embodiment in the configuration of the spiral wiring. This different configuration will hereinafter be described. In the third embodiment, the same constituent elements as the first embodiment are denoted by the same reference numerals as the first embodiment and therefore will not be described.

As shown in FIGS. 7A and 7B, similarly to the inductor component 1, an inductor component 1B includes the vertical wirings 51 to 53 extending from spiral wirings 21, 22 in the Z direction to penetrate the inside of the first magnetic layer 11 or the second magnetic layer 12.

On the other hand, the inductor component 1B has the first spiral wiring 21 and the second spiral wiring 22 as a plurality of spiral wirings and further includes a second via conductor 27 connecting the first spiral wiring 21 and the second spiral wiring 22 in series. Specifically, the first spiral wiring 21 and the second spiral wiring 22 are laminated in the Z direction. The first spiral wiring 21 is spirally wound in a counterclockwise direction from the outer circumferential end 21*b* toward the inner circumferential end 21*a* when viewed from the upper side. The second spiral wiring 22 is spirally wound in a counterclockwise direction from an inner circumferential end 22*a* toward an outer circumferential end 22*b* when viewed from the upper side.

The outer circumferential end 21*b* of the first spiral wiring 21 is connected to the first external terminal 41 through the first vertical wiring 51 (the via conductor 25 and the first columnar wiring 31) on the upper side of the outer circumferential end 21*b*. The inner circumferential end 21*a* of the first spiral wiring 21 is connected to the inner circumferential end 22*a* of the second spiral wiring 22 through the second via conductor 27 on the lower side of the inner circumferential end 21*a*.

The outer circumferential end 22*b* of the second spiral wiring 22 is connected to the second external terminal 42 through the second vertical wiring 52 (the via conductors 25, 26 and the second columnar wiring 32) on the upper side of the outer circumferential end 22*b*. The outer circumferential end 22*b* of the second spiral wiring 22 is connected to the third external terminal 43 through the third vertical wiring 53 (the via conductor 25 and the third columnar wiring 33) on the lower side of the outer circumferential end 22*b*. The via conductor 26 extends in the Z direction from the via conductor 25 on the upper side of the outer circumferential end 22*b* of the second spiral wiring 22 to penetrate the inside of the insulating layer 15. The via conductor 26 is formed on the same plane as the first spiral wiring 21.

The same layer including the second via conductor 27 includes only the conductor, the inorganic filler, and the organic resin. In other words, the same layer includes only the second via conductor 27, the insulating layer 15, and the magnetic layer 10. Therefore, the same layer as the second via conductor 27 does not include a base material such as glass cloth requiring a certain thickness and is thus relatively reduced in amount of a portion that does not contribute to the electric characteristics while enabling the thinning, so that the electric characteristics can be improved even though the thickness is the same. It is noted that "the same layer as the second via conductor 27" refers to a portion (layer) at the same position as the region from the upper end to the lower end of the second via conductor 27 in the normal direction (Z direction). In other words, the same layer refers to a portion (layer) on the same plane as the region from the upper end to the lower end of the second via conductor 27 in terms of the plane parallel to the plane of the wound spiral wiring 21.

In contrast, the conventional inductor component has a nonmagnetic printed circuit board, and the thickness of the printed circuit board is as thick as 60 μm, so that as a chip thickness becomes smaller, a proportion of a nonmagnetic region increases in a whole chip. Consequently, as the chip thickness becomes smaller, the acquisition efficiency of inductance is more reduced. A DC resistance Rdc is an important characteristic index of power inductors, and if it is attempted to reduce the chip thickness while maintaining the DC resistance Rdc, the chip thickness must be reduced while maintaining the thickness of the spiral wiring, and therefore, the thickness of the magnetic layer consequently becomes smaller, so that a decrease in acquisition efficiency of inductance and a magnetic flux leakage may occur. For example, if the magnetic flux leaks toward the land pattern, an eddy current is generated in the conductor of the land pattern, and the generated eddy current generates a new magnetic flux in a direction canceling the magnetic flux. As a result, the inductance decreases. Additionally, propagation of magnetic noise due to the leakage magnetic flux may possibly have an influence on surrounding electronic components.

The thickness of the same layer as the second via conductor 27 is preferably 1 μm or more and 20 μm or less (i.e., from 1 μm to 20 μm). Therefore, since the thickness of the same layer as the second via conductor 27 is 1 μm or more, a short circuit between the spiral wirings can reliably be prevented, and since the thickness of the same layer as the second via conductor 27 is 20 μm or less, the thin inductor component 1B can be provided.

The inorganic filler is preferably composed of at least one of an FeSi alloy, an FeCo alloy, an FeAl alloy, an amorphous alloy thereof, and $SiO_2$, and the average particle diameter of the inorganic filler is preferably 5 μm or less. Therefore, a loss can be reduced at high frequency and the insulation can be ensured.

Since the inductor component 1B has the first spiral wiring 21 and the second spiral wiring 22 connected in series by the second via conductor 27, the number of turns can be increased to improve the inductance value. Since the first to third vertical wirings 51 to 53 can be taken out from the outer circumferences of the first and second spiral wirings 21, 22, the inner diameters of the first and second spiral wirings 21, 22 can be made large to improve the inductance value.

Since the first spiral wiring 21 and the second spiral wiring 22 are both laminated in the normal direction, the inductor component 1B can be reduced in the area viewed in the Z direction, i.e., the mounting area, with respect to the number of turns, so that the inductor component 1B can be reduced in size.

Although the inductor component 1B has a configuration including an even number of the series-connected spiral wirings, the present disclosure is not limited thereto, and an odd number of series-connected spiral wirings may be included. The vertical wiring leads out a wiring from the spiral wiring in the Z direction and, therefore, even if an odd number of series-connected spiral wirings is included and one end portion of the inductor is disposed on the inner circumferential side, it is not necessary to lead out this end portion toward the outer circumference. Therefore, in this case, thinning can be achieved. Since a degree of freedom in the number of series-connected spiral wirings is improved in this way, a degree of freedom is also improved in the range of setting of the inductance value.

Although the inductor component 1B has one inductor made up of two layers of spiral wirings and disposed on the same plane, two or more inductors may be arranged on the same plane.

(Manufacturing Method)

A manufacturing method of the inductor component 1B will be described.

Figure 8A:
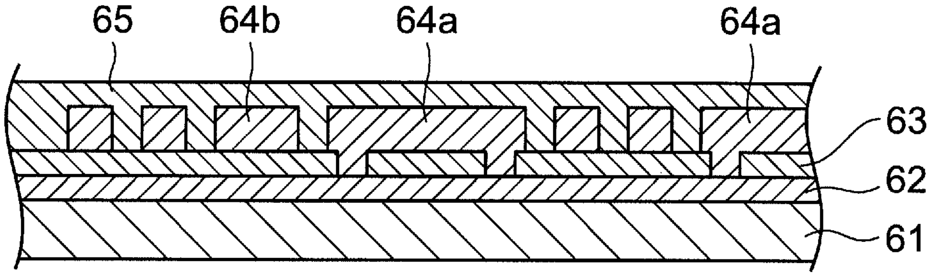
FIG. 8A is an explanatory view for explaining a manufacturing method of the inductor component according to the third embodiment.

First, the steps shown in FIGS. 4A to 4C of the manufacturing method of the inductor component 1 are executed. Subsequently, as shown in FIG. 8A, the first dummy copper 64*a* and the first spiral wiring 64*b* are covered with the first insulating layer 65. The insulating layer 65 is thermally press-bonded and thermally cured by a vacuum laminator, a press machine, etc.

Figure 8B:
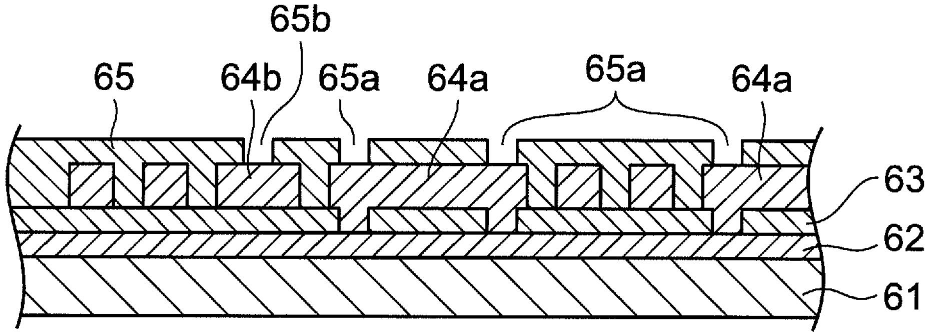
FIG. 8B is an explanatory view for explaining the manufacturing method of the inductor component according to the third embodiment.

As shown in FIG. 8B, the opening part 65*a* is formed by opening the insulating layer 65 on the dummy copper 64*a*, and an opening part 65*b* is formed by opening the insulating layer 65 on an end portion of the spiral wiring 64*b*, by laser processing etc.

Figure 8C:
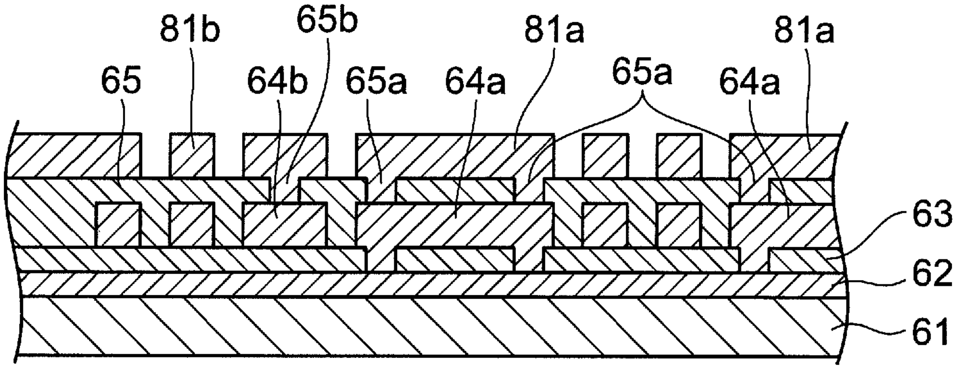
FIG. 8C is an explanatory view for explaining the manufacturing method of the inductor component according to the third embodiment.

As shown in FIG. 8C, SAP and a subsequent additional copper electrode plating are performed as in FIG. 8C to form a second dummy copper 81*a* and a second spiral wiring 81*b*. If the number of laminated spiral wirings is increased, FIGS. 8A to 8C may be repeated.

Figure 8D:
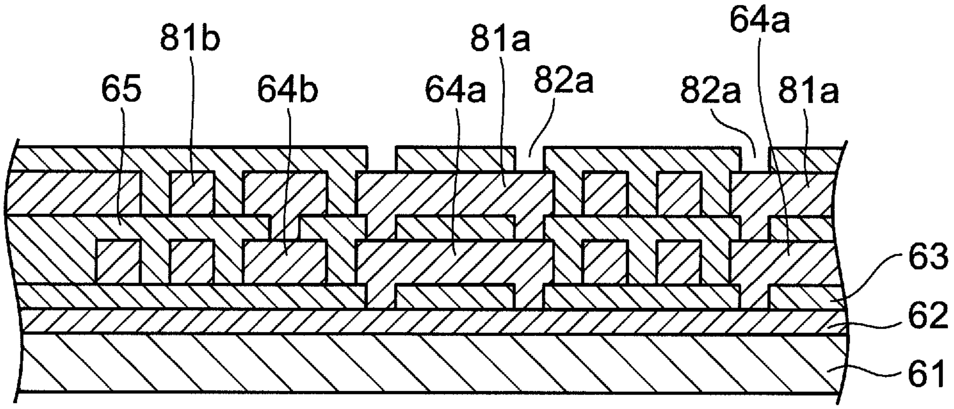
FIG. 8D is an explanatory view for explaining the manufacturing method of the inductor component according to the third embodiment.

As shown in FIG. 8D, the second dummy copper 81*a* and the second spiral wiring 81*b* are covered with a second insulating layer 82. The insulating layer 82 is thermally press-bonded and thermally cured by a vacuum laminator, a press machine, etc. An opening 82*a* of the insulating layer 82 on the second dummy copper 81*a* is formed by laser processing etc.

Figure 8E:
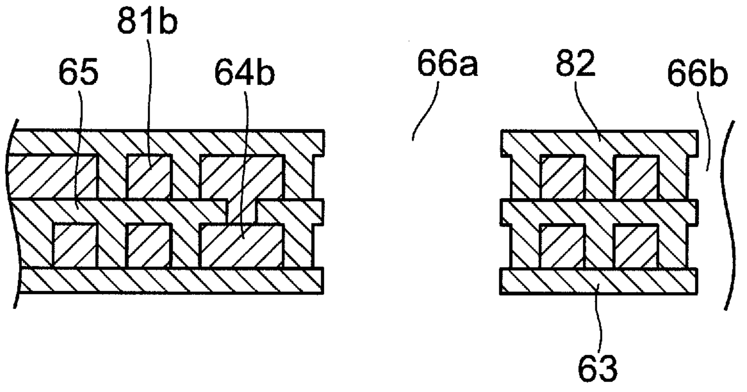
FIG. 8E is an explanatory view for explaining the manufacturing method of the inductor component according to the third embodiment.

Subsequently, the dummy core substrate 61 is peeled off from the copper foil 62. The copper foil 62 is removed by etching etc., and the dummy copper 64*a* is removed by etching etc., before forming the hole part 66*a* corresponding to the inner magnetic path part and the hole part 66*b* corresponding to the outer magnetic path part as shown in FIG. 8E.

Figure 8F:
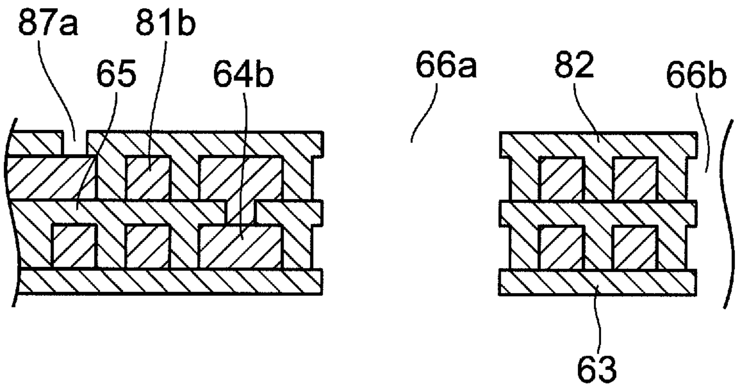
FIG. 8F is an explanatory view for explaining the manufacturing method of the inductor component according to the third embodiment.
Figure 8G:
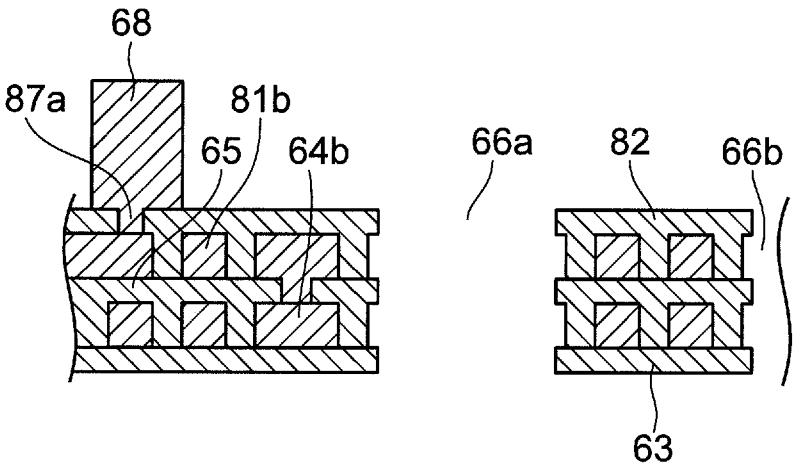
FIG. 8G is an explanatory view for explaining the manufacturing method of the inductor component according to the third embodiment.

Subsequently, as shown in FIG. 8F, an opening part 87*a* of the insulating layer 82 is formed by laser processing etc. As shown in FIG. 8G, the opening part 87*a* of the insulating layer 82 is then filled with copper by SAP and the columnar wiring 68 is formed on the insulating layer 82.

Figure 8H:
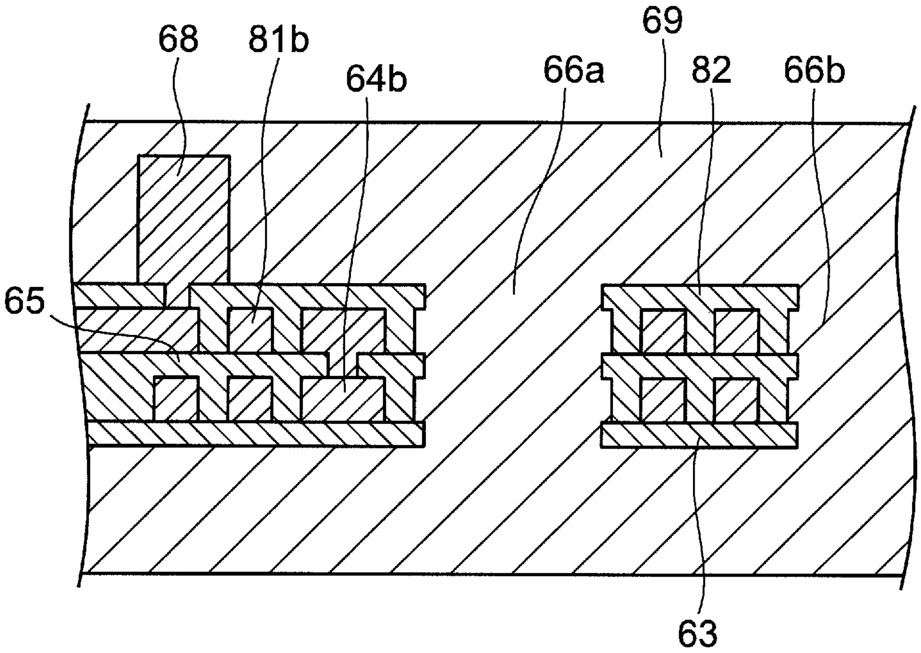
FIG. 8H is an explanatory view for explaining the manufacturing method of the inductor component according to the third embodiment.

As shown in FIG. 8H, the spiral wiring, the insulating layer, and the columnar wiring are covered with the magnetic material (magnetic layer) 69 to form an inductor substrate. The magnetic material 69 is thermally press-bonded and thermally cured by a vacuum laminator, a press machine, etc. At this time, the magnetic material 69 is also filled into the hole parts 66*a*, 66*b*.

Figure 8I:
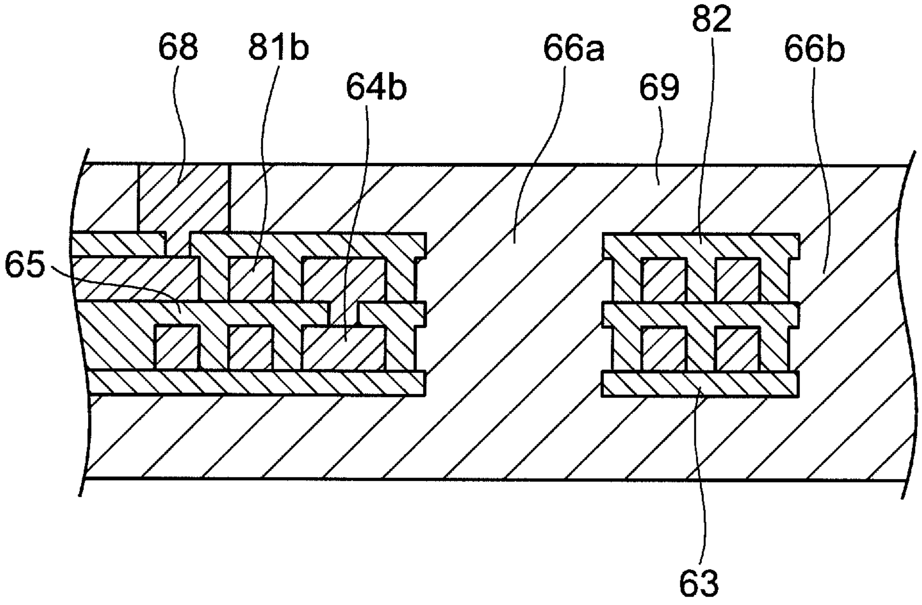
FIG. 8I is an explanatory view for explaining the manufacturing method of the inductor component according to the third embodiment.

As shown in FIG. 8I, the magnetic material 69 on the upper and lower sides of the inductor substrate is reduced in thickness by a grinding method. In this case, the columnar wiring 68 is partially exposed so that an exposed portion of the columnar wiring 68 is formed on the same plane as the magnetic material 69.

Figure 8J:
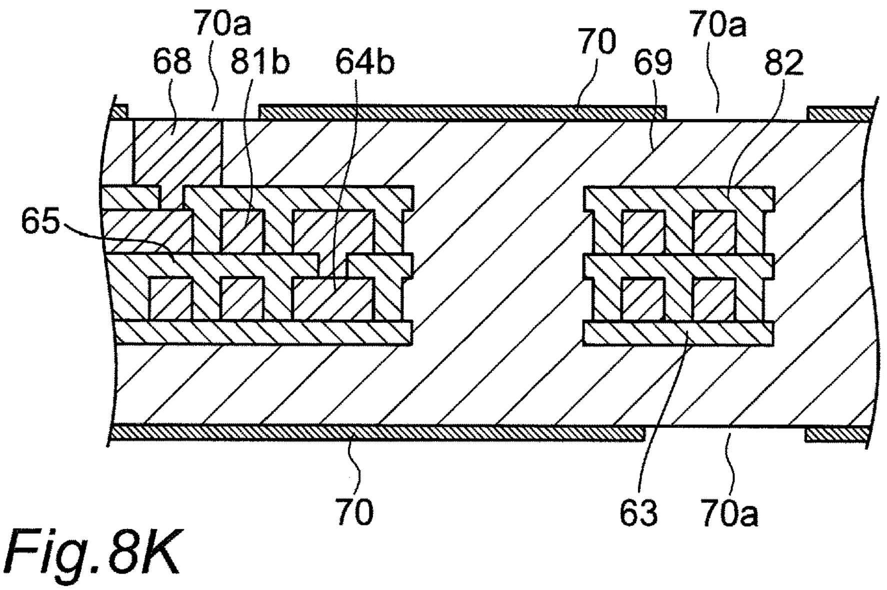
FIG. 8J is an explanatory view for explaining the manufacturing method of the inductor component according to the third embodiment.

Subsequently, as shown in FIG. 8J, the insulating resin (insulating layer) 70 is formed on a magnetic substance surface by a printing method. The opening part 70*a* of the insulating resin 70 is used as a portion for formation of an external terminal. Although the printing method is used in the above description, the opening part 70*a* may be formed by a photolithography method.

Figure 8K:
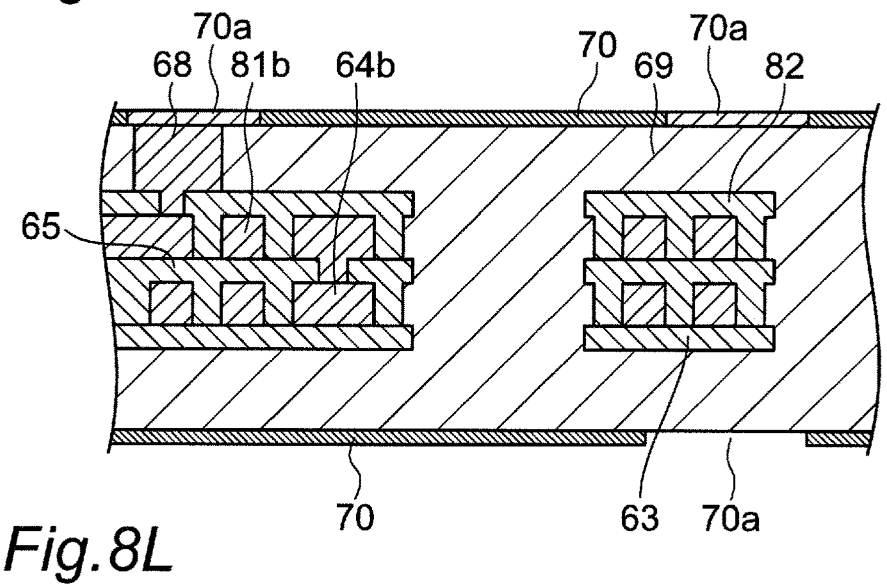
FIG. 8K is an explanatory view for explaining the manufacturing method of the inductor component according to the third embodiment.
Figure 8L:
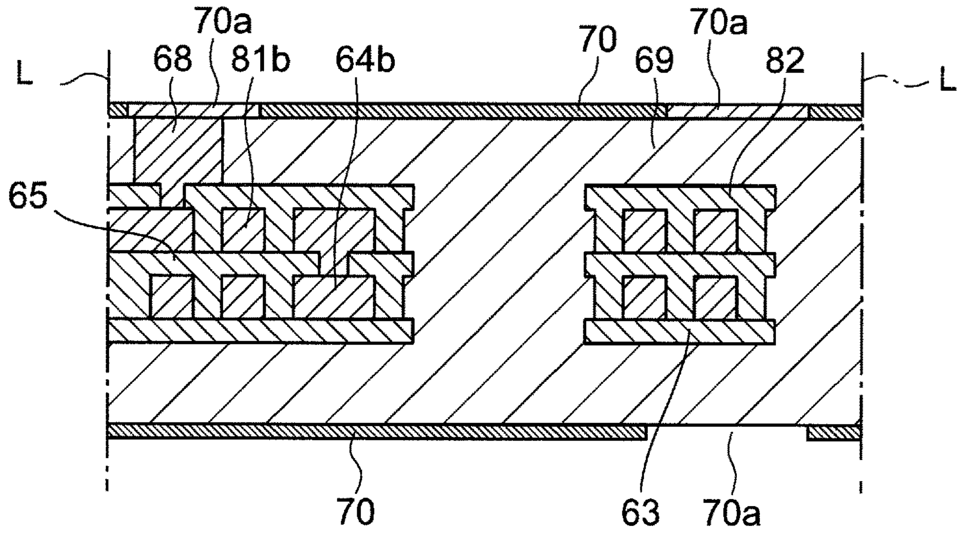
FIG. 8L is an explanatory view for explaining the manufacturing method of the inductor component according to the third embodiment.

As shown in FIG. 8K, an electroless copper plating or a plating film of Ni and Au etc. is applied to form the external terminal 71*a* and, as shown in FIG. 8L, dicing is performed along broken line portions L to form individual pieces so as to acquire the inductor component 1B of FIG. 7B. The inductor substrates may be formed on both surfaces of the dummy core substrate 61. As a result, higher productivity can be achieved.

The present disclosure is not limited to the embodiments described above and may be changed in design without departing from the spirit of the present disclosure. For example, respective feature points of the first to third embodiments may variously be combined.

Even if the first to third embodiments include an embodiment in which an effect described in another embodiment is not particularly mentioned and is not described, basically the same effect is produced by the embodiment as well, given that the embodiment has the same configuration.

What is claimed is:

1. An inductor component comprising:

a spiral wiring wound on a plane;

a first magnetic layer and a second magnetic layer located at positions sandwiching the spiral wiring from both sides in a normal direction relative to the plane of the spiral wiring;

a vertical wiring extending from the spiral wiring in the normal direction to penetrate at least the inside of the first magnetic layer out of the first magnetic layer and the second magnetic layer;

an insulating layer that is between the spiral wiring and the second magnetic layer;

a resin layer that is between the first magnetic layer and the second magnetic layer, and a portion of the resin layer is external to an outer perimeter of the spiral wiring; and an external terminal disposed on at least a surface of the first magnetic layer out of the first magnetic layer and the second magnetic layer to cover an end surface of the vertical wiring, wherein the first magnetic layer is larger than the second magnetic layer in terms of an area of the external terminal viewed in the normal direction, a thickness of the first magnetic layer is greater than a thickness of the second magnetic layer, and the first magnetic layer includes a substantially spherical magnetic powder and the second magnetic layer includes a flattened magnetic powder, and, in the second magnetic layer, a major axis of the flattened magnetic powder is arranged along a direction orthogonal to the normal direction.

2. The inductor component according to claim 1, wherein the thickness of the first magnetic layer and the thickness of the second magnetic layer are each 10 μm or more.

3. The inductor component according to claim 1, wherein the spiral wiring is a conductor made of copper or a copper compound.

4. The inductor component according to claim 1, wherein the spiral wiring is covered with the insulating layer that includes an insulating resin made of an inorganic filler and an organic resin.

5. The inductor component according to claim 1, wherein a thickness of the inductor component is 0.35 mm or less.

6. The inductor component according to claim 1, wherein when A is a thickness of the first magnetic layer and B is a thickness of the second magnetic layer, A/((A+B)/2) is from 0.6 to 1.6.

7. The inductor component according to claim 6, wherein a thickness of the spiral wiring is from (A+B)/2 to 2 (A+B).

8. The inductor component according to claim 7, wherein a thickness of the inductor component is 0.2 mm or less.

9. The inductor component according to claim 6, wherein the spiral wiring is a conductor made of copper or a copper compound.

10. The inductor component according to claim 6, wherein the spiral wiring is covered with the insulating layer that includes an insulating resin made of an inorganic filler and an organic resin.

11. The inductor component according to claim 6, wherein a thickness of the inductor component is 0.35 mm or less.

12. The inductor component according to claim 11, wherein a thickness of the inductor component is 0.2 mm or less.

13. The inductor component according to claim 1, wherein a magnetic permeability of the second magnetic layer is higher than a magnetic permeability of the first magnetic layer.

14. The inductor component according to claim 13, wherein the vertical wiring is not present inside the second magnetic layer.

15. The inductor component according to claim 14, wherein the first magnetic layer is a composite material of an inorganic filler made of an FeSi- or FeCo- or FeAl-based alloy or an amorphous alloy thereof and an epoxy- or polyimide- or phenol-based organic resin, wherein the content percentage of the inorganic filler is 50 vol % or more based on the organic resin, and the inorganic filler is substantially spherical.

16. The inductor component according to claim 13, wherein at least a portion between the first magnetic layer and the second magnetic layer includes a region in which an amount of magnetic powder is smaller as compared to the first magnetic layer and the second magnetic layer.

17. The inductor component according to claim 16, wherein a thickness of the region is from 0.5 μm to 30 μm.

18. The inductor component according to claim 1, wherein the spiral wiring is one of multiple spiral wirings, a via conductor connecting the spiral wirings in series is further included between the multiple spiral wirings, and a same layer as the via conductor includes only the via conductor, an inorganic filler, and an organic resin.

19. The inductor component according to claim 18, wherein a thickness of the same layer as the via conductor is from 1 μm to 20 μm.

20. The inductor component according to claim 18, wherein the inorganic filler is made of at least one of an FeSi alloy, an FeCo alloy, an FeAl alloy, an amorphous alloy thereof, and SiO2, and wherein the average particle size of the inorganic filler is 5 μm or less.

* * * * *